(12) United States Patent
Shibao

(10) Patent No.: US 9,077,830 B2
(45) Date of Patent: Jul. 7, 2015

(54) IMAGE FORMING APPARATUS, INFORMATION PROCESSING APPARATUS, PRINTING SYSTEM, IMAGE FORMING METHOD, IMAGE FORMING PROGRAM, AND STORAGE MEDIUM

(75) Inventor: Koki Shibao, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 468 days.

(21) Appl. No.: 13/129,656

(22) PCT Filed: Feb. 21, 2011

(86) PCT No.: PCT/JP2011/054412
§ 371 (c)(1),
(2), (4) Date: May 17, 2011

(87) PCT Pub. No.: WO2011/105592
PCT Pub. Date: Sep. 1, 2011

(65) Prior Publication Data
US 2012/0140257 A1  Jun. 7, 2012

(30) Foreign Application Priority Data

Feb. 24, 2010  (JP) ................................. 2010-038657

(51) Int. Cl.
*G06F 3/12* (2006.01)
*H04N 1/00* (2006.01)
*B42D 15/00* (2006.01)

(52) U.S. Cl.
CPC ....... *H04N 1/00347* (2013.01); *H04N 1/00482* (2013.01); *H04N 1/00925* (2013.01); *H04N 2201/001* (2013.01); *H04N 2201/0039* (2013.01); *H04N 2201/0094* (2013.01)

(58) Field of Classification Search
USPC .......................................... 358/1.13; 283/117
See application file for complete search history.

(56) References Cited

U.S. PATENT DOCUMENTS 5,524,932 A * 6/1996 Kalisher .......................... 283/67
5,974,233 A * 10/1999 Nishiyama et al. .......... 358/1.16
(Continued)

FOREIGN PATENT DOCUMENTS

| JP | 09-214737 A | 8/1997 |
| JP | 2003-288336 A | 10/2003 |

(Continued)

OTHER PUBLICATIONS

International Search Report; International application No. PCT/JP2011/054112; mailed May 31, 2011.
(Continued)

*Primary Examiner* — Ashish K Thomas
*Assistant Examiner* — Neil R McLean
(74) *Attorney, Agent, or Firm* — Carter, DeLuca, Farrell & Schmidt, LLP

(57) ABSTRACT

An image forming apparatus capable of performing excellent image formation with a reduced amount of data transfer. The image forming apparatus has a plurality of image processing functions. The image forming apparatus is connectable to an external apparatus having a plurality of image processing functions. The image forming apparatus transmits information indicative of selected at least one image processing function thereof and selected at least one image processing function of the information processing apparatus, to the information processing apparatus. When information indicative of an image processing function to be provided by the information processing apparatus on behalf of the image processing apparatus is received as a result of determination performed by the information processing apparatus based on the transmitted information and predetermined conditions, the image forming apparatus is controlled not to use the image processing function.

14 Claims, 15 Drawing Sheets

(56) References Cited

U.S. PATENT DOCUMENTS

| | | | |
|---|---|---|---|
| 6,116,906 A * | 9/2000 | Rifkin | 434/105 |
| 2003/0164988 A1 * | 9/2003 | Enomoto et al. | 358/400 |
| 2006/0195495 A1 * | 8/2006 | Asano | 708/111 |
| 2008/0150952 A1 | 6/2008 | Koarai | |

FOREIGN PATENT DOCUMENTS

| | | |
|---|---|---|
| JP | 2006-238199 A | 9/2006 |
| JP | 2008-139981 A | 6/2008 |

OTHER PUBLICATIONS

International Search Report for corresponding application No. PCT/JP2011/054412 mailed May 31, 2011.

Office Action issued on Mar. 11, 2014, in counterpart Japanese Application No. 2010-038657.

* cited by examiner

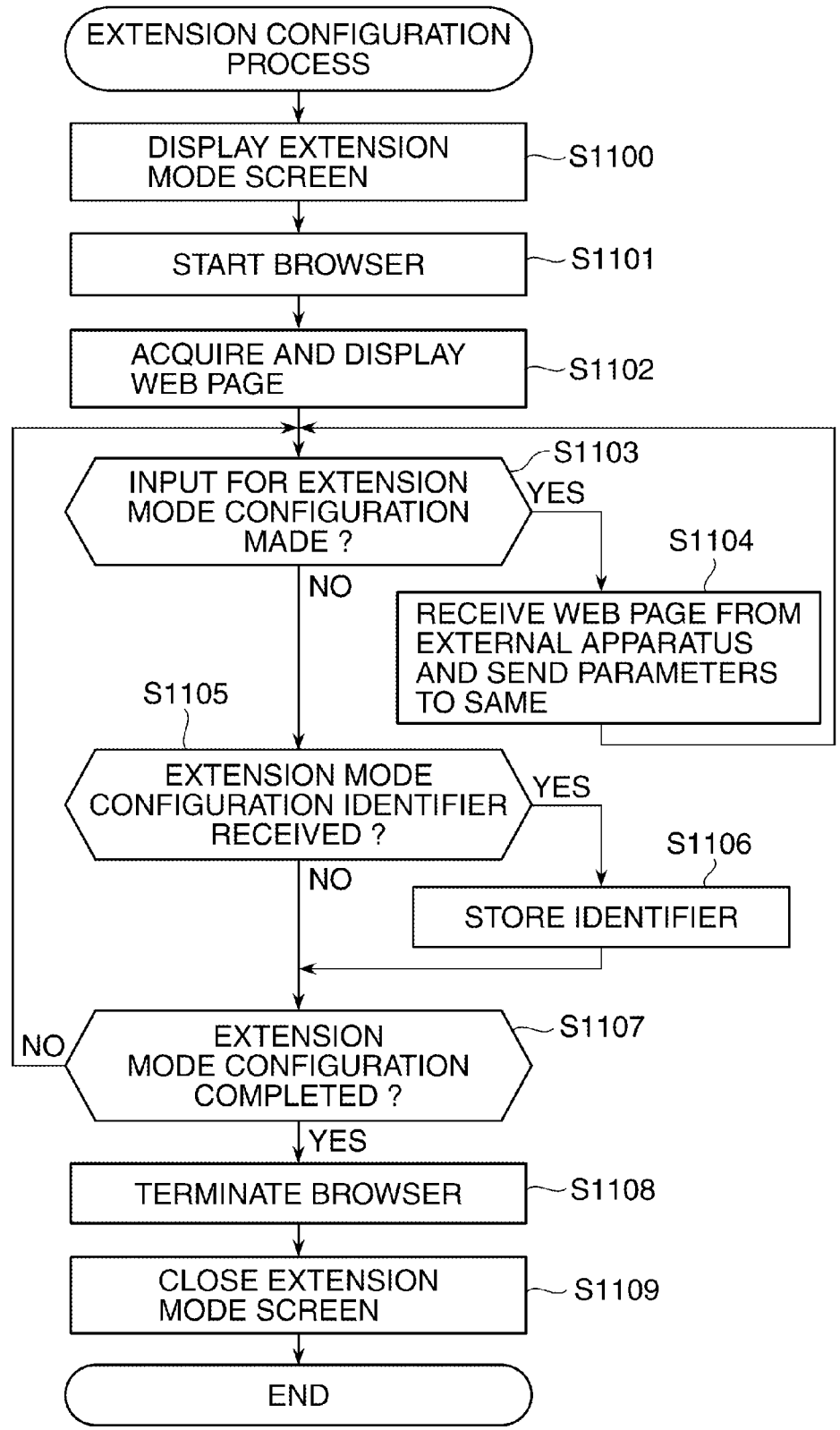

FIG. 9A

| FUNCTION | IMAGE PROCESSING METHOD | DETAILED CONFIGURATION PARAMETER |
|---|---|---|
| NUMBER OF COPIES | ○ | 10 |
| MAGNIFICATION /REDUCTION | ○ 1 | 100% |
| FRAME ERASE | × 2 | |
| STAPLE | ○ | ONE LOCATION IN UPPER LEFT CORNER |

FIG. 9B

| ID | IMAGE PROCESSING FUNCTION | DETAILED PARAMETER |
|---|---|---|
| 1 | MAGNIFICATION /REDUCTION | ALGORITHM 1 |
| 2 | TRIMMING | NONE |
| 3 | IMAGE SYNTHESIS | INCLUDING BLEND FUNCTION |
| 4 | DENSITY ADJUSTMENT | 9 LEVELS |

FIG. 11A

| IMAGE PROCESSING FUNCTION OF IMAGE FORMING APPARATUS | DETAILED CONFIGURATION PARAMETER | SUBSTITUTION PROCESSING |
|---|---|---|
| MAGNIFICATION /REDUCTION | MORE THAN 100% | ○ |
| | 100% OR LESS | × |
| | NOT DESIGNATED | ○ |

FIG. 11B

| IMAGE PROCESSING BY IMAGE FORMING APPARATUS \ IMAGE PROCESSING BY EXTERNAL APPARATUS | | IMAGE REPEAT | MOVE |
|---|---|---|---|
| MAGNIFICATION /REDUCTION | 100% | × | × |
| | OTHER THAN 100% | N/A | × |
| TRIMMING | | ○ | ○ |

FIG. 11C

| IMAGE PROCESSING FUNCTION OF IMAGE FORMING APPARATUS | DETAILED PARAMETER | SUBSTITUTION PROCESSING |
|---|---|---|
| MAGNIFICATION /REDUCTION | ALGORITHM 1 | ○ |
| | ALGORITHM 2 | × |
| | NOT DESIGNATED | × |

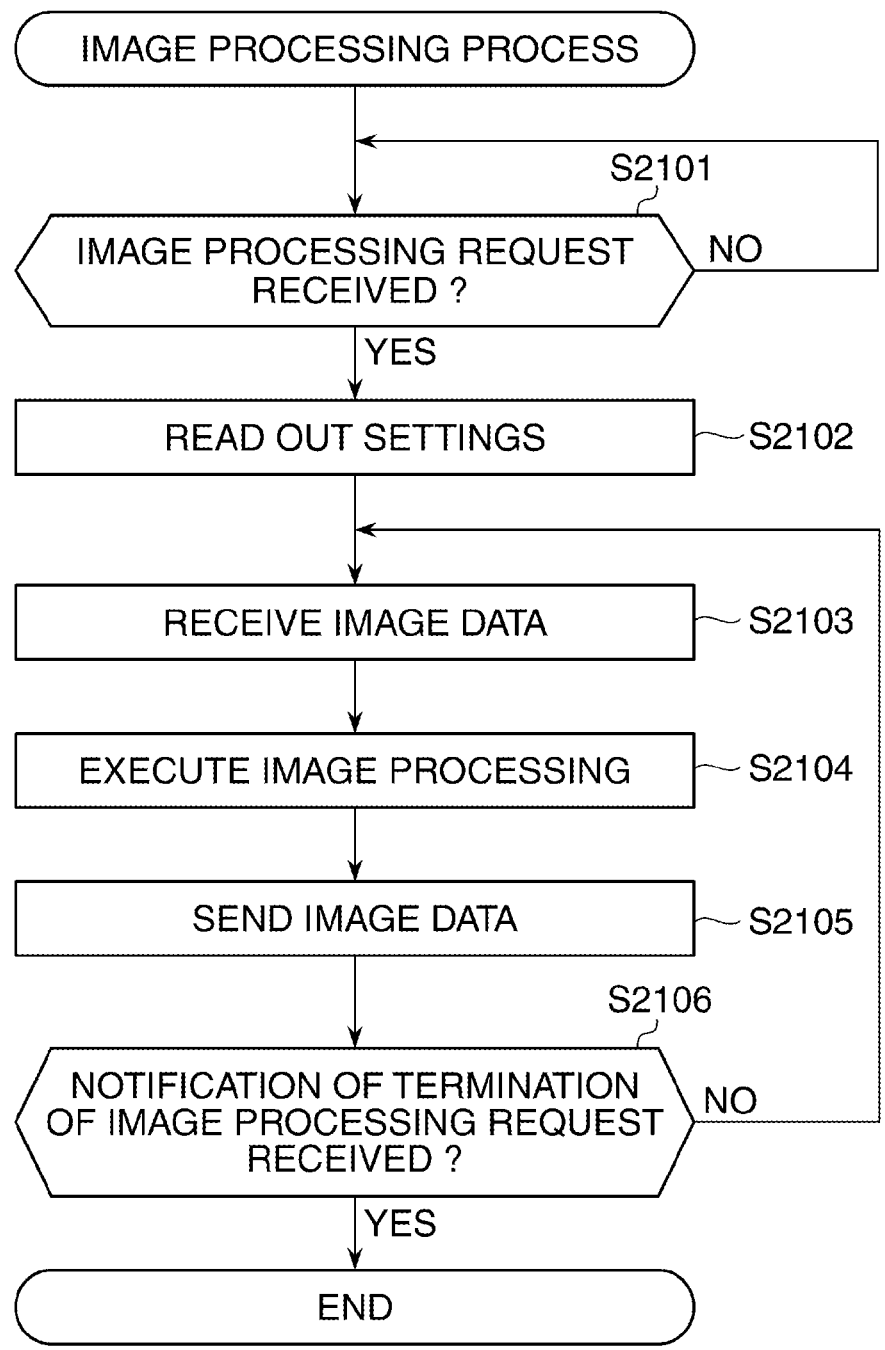

IMAGE FORMING APPARATUS, INFORMATION PROCESSING APPARATUS, PRINTING SYSTEM, IMAGE FORMING METHOD, IMAGE FORMING PROGRAM, AND STORAGE MEDIUM

CROSS REFERENCE TO RELATED APPLICATIONS

This application is a National Stage filing of PCT Application No. PCT/JP2011/054412filed on Feb. 21, 2011, which claims priority from Japanese Patent Application No. 2010-038657filed on Feb. 24, 2010, the disclosures of each of which are hereby incorporated by reference herein in their entirety.

TECHNICAL FIELD

The present invention relates to an image forming apparatus, an information processing apparatus, and a printing system, which perform image processing on image data so as to carry out printing according to the image data, an image forming method, an image forming program, and a storage medium, and more particularly to an image forming apparatus and a printing system which perform image processing using an information processing apparatus as an external apparatus, an image forming method, an image forming program, and a storage medium.

BACKGROUND ART

In general, an image forming apparatus, such as a printer, is equipped with various functions (so-called image forming functions), and the functions include a so-called Nin1 copy function of collectively printing a plurality of sheets of original images on a single sheet. Further, the functions include an insertion function of performing printing while inserting insert sheets between specific pages, and a synthesis function of synthesizing an original image with a specific image and outputting the synthesized image. A single image forming apparatus can perform printing by combining a plurality of printing functions typified by the above-mentioned functions.

On the other hand, printing systems have been proposed which realize a printing function not provided in an image forming apparatus, using an external apparatus (information processing apparatus).

For example, there has been proposed a printing system in which when a user designates a predetermined function via an operation panel (console section) provided in an image forming apparatus, the image forming apparatus sends a request for the function and image data of an original input thereto to an external apparatus (see PTL 1). The image forming apparatus receives processed image data subjected to image processing by the external apparatus, and performs printing according to the processed image data.

In this case, a storage section of the image forming apparatus stores in advance programs (control programs) for controlling the console section and screen resources for the display of the console section, which are adapted to image processing functions provided in the external apparatus. Therefore, when the version of an image processing function of the external apparatus is upgraded, it is required to upgrade the version of the associated control program and the associated screen resources of the image forming apparatus as well. In other words, the programs provided in the image forming apparatus depend on the functions (i.e. programs) of the external apparatus.

On the other hand, there has been proposed a printing system in which a web page provided by an external apparatus is displayed on an operation panel of an image forming apparatus, and various applications stored in the external apparatus are executed according to operations performed on the web page (see PTL 2). In this example, an image forming program stored in the image forming apparatus operates in association with the applications. In this case, a storage section of the external apparatus stores in advance the applications, screen resources for inputting parameters to the applications, etc.

Therefore, it is possible to upgrade the version of each of the applications independently of the image forming apparatus. However, the version of the image forming program stored in the image forming apparatus is not upgraded along with the version upgrade of each associated application, and hence a function realized by the application cannot be used in combination with printing functions of the image forming apparatus. In other words, it becomes impossible to operate the functions of the external apparatus and the functions of the image forming apparatus in a cooperative manner.

CITATION LIST

Patent Literature

PTL 1: Japanese Patent Laid-Open Publication No. 2003-288336
PTL 2: Japanese Patent Laid-Open Publication No. 2008-139981

SUMMARY OF INVENTION

Technical Problem

To solve the above problem, it is only required to enable independent program version upgrade in each of the external apparatus and the image forming apparatus such that printing can be performed using the functions of the two apparatuses in a combined manner. However, this causes new problems described below.

Now, let it be assumed that function extension in the image forming apparatus is performed using the external apparatus and a job is executed by combining an extension function provided by the external apparatus and functions of the image forming apparatus. In this case, the external apparatus generates a screen only for a function extended thereby, and the image forming apparatus makes use of the screen.

On the other hand, also in performing image processing, it is preferable that what can be done by the image forming apparatus is performed by the image forming apparatus itself, and the external apparatus performs what can be done only by the external apparatus.

In such a case, however, the amount of data transfer between the image forming apparatus and the external apparatus sometimes markedly increases depending on the result of image processing performed by the image forming apparatus. For example, the amount of data subjected to variable power (magnification) processing by the image forming apparatus is larger than before the data is subjected to the processing. Moreover, the output result of an image can vary depending on which of the image forming apparatus and the external apparatus is the first to execute image processing. Therefore, the output result of an image cannot be guaranteed depending on a printing environment. For example, in executing frame erasure processing and move processing of an image, the output result is different between a case where the move processing is performed on an image subjected to the frame erasure processing and a case where the frame erasure processing is performed on an image subjected to the move processing.

Further, in generally well-known distributed processing, a job is transferred to another server apparatus or processing of a job is distributed across devices such that different pages of the job are processed by different devices. Therefore, it is difficult to apply distributed processing if processing for forming an image of a single page is to be distributed between a plurality of apparatuses Solution to Problem The present invention provides an image forming apparatus, an information processing apparatus, and a printing system, which are capable of performing excellent image formation with a reduced amount of data transfer even in the case where image formation is performed on a page-by-page basis by cooperation of a plurality of apparatuses, an image forming method, an image forming program, and a storage medium.

Accordingly, in a first aspect of the present invention, there is provided an image forming apparatus having a plurality of image processing functions and configured to perform image formation using the image processing functions, the image forming apparatus being connectable to an information processing apparatus having a plurality of image processing functions via a network, comprising a first selection unit configured to select at least one of the image processing functions of the image forming apparatus, a second selection unit configured to select at last one of the image processing functions of the image processing apparatus, a transmission unit configured to transmit information indicative of the at least one of the image processing functions of the image forming apparatus selected by the first selection unit and the at least one of the image processing functions of the information processing apparatus selected by the second selection unit to the information processing apparatus, and a control unit configured to be operable when information indicative of an image processing function to be provided by the information processing apparatus on behalf of the image processing apparatus is received as a result of determination performed by the information processing apparatus based on the information sent by the transmission unit and predetermined conditions, to control the image forming apparatus such that the image forming apparatus does not use the image processing function.

Accordingly, in a second aspect of the present invention, there is provided an information processing apparatus having a plurality of image processing functions, comprising a connection unit configured to connect to an image forming apparatus which has a plurality of image processing functions and is configured to perform image formation using the image processing functions, a reception unit configured to receive information indicative of selected at least one of the plurality of image processing functions of the image forming apparatus and selected at least one of the plurality of image processing functions of the information processing apparatus, a determination unit configured to determine whether or not there is an image processing function to be provided by the information processing apparatus on behalf of the image forming apparatus, based on the information received by the reception unit and predetermined conditions, and a transmission unit configured to send a result of the determination by the determination unit to the image forming apparatus.

Accordingly, in a third aspect of the present invention, there is provided a printing system comprising the image forming apparatus and the information processing apparatus.

Accordingly, in a fourth aspect of the present invention, there is provided an image forming method of performing image formation using an image forming apparatus having a plurality of image processing functions and configured to perform image formation, the image forming apparatus being connectable to an information processing apparatus having a plurality of image processing functions via a network, comprising selecting at least one of the image processing functions of the image forming apparatus, selecting at last one of the image processing functions of the image processing apparatus, transmitting information indicative of the selected at least one of the image processing functions of the image forming apparatus and the selected at least one of the image processing functions of the information processing apparatus, to the information processing apparatus, and controlling, when information indicative of an image processing function to be provided by the information processing apparatus on behalf of the image processing apparatus is received as a result of determination performed by the information processing apparatus based on the transmitted information and predetermined conditions, the image forming apparatus such that the image forming apparatus does not use the image processing function.

Accordingly, in a fifth aspect of the present invention, there is provided a computer-executable image forming program for causing a computer to execute an image forming method of performing image formation using an image forming apparatus having a plurality of image processing functions and configured to perform image formation, the image forming apparatus being connectable to an information processing apparatus having a plurality of image processing functions via a network, wherein the image forming method comprises selecting at least one of the image processing functions of the image forming apparatus, selecting at last one of the image processing functions of the image processing apparatus, transmitting information indicative of the selected at least one of the image processing functions of the image forming apparatus and the selected at least one of the image processing functions of the information processing apparatus, to the information processing apparatus, and controlling, when information indicative of an image processing function to be provided by the information processing apparatus on behalf of the image processing apparatus is received as a result of determination performed by the information processing apparatus based on the transmitted information and predetermined conditions, the image forming apparatus such that the image forming apparatus does not use the image processing function.

Accordingly, in a sixth aspect of the present invention, there is provided a non-transitory computer-readable storage medium storing the image forming program.

Advantageous Effects of Invention

As described above, according to the present invention, it is possible to make effective use of an external apparatus according to image processing functions (extension functions) provided by the external apparatus, irrespective of image processing functions of the image forming apparatus, to thereby make it possible to perform a high-speed and more reliable image formation processing. As a result, the present invention has an advantageous effect of being capable of performing excellent image formation with a reduced amount of data transfer even in the case where image formation is performed on a page-by-page basis by cooperation of a plurality of apparatuses.

The features and advantages of the invention will become more apparent from the following detailed description taken in conjunction with the accompanying drawings.

BRIEF DESCRIPTION OF DRAWINGS

FIG. 6 is a flowchart of an extension configuration process executed in a step in FIG. 5A.

FIG. 9A is a diagram showing an example of configuration information concerning the image forming apparatus, which is useful in explaining received data mentioned in the storage process in FIG. 8 in detail.

FIG. 9B is a diagram showing an example of image processing function information indicative of image processing functions provided in the image forming apparatus, which is useful in explaining the received data mentioned in the storage process in FIG. 8 in detail.

FIG. 11A is a diagram showing an example of a first condition information table as determination condition information stored in a storage section of the external apparatus in FIG. 1.

FIG. 11B is a diagram showing an example of a second condition information table as determination condition information stored in the storage section of the external apparatus in FIG. 1.

FIG. 11C is a diagram showing an example of a third condition information table as determination condition information stored in the storage section of the external apparatus in FIG. 1.

FIG. 14 is a flowchart of an image processing process executed by the external apparatus in FIG. 1.

DESCRIPTION OF EMBODIMENTS

The present invention will now be described in detail below with reference to the drawings showing an embodiment thereof.

Figure 1:
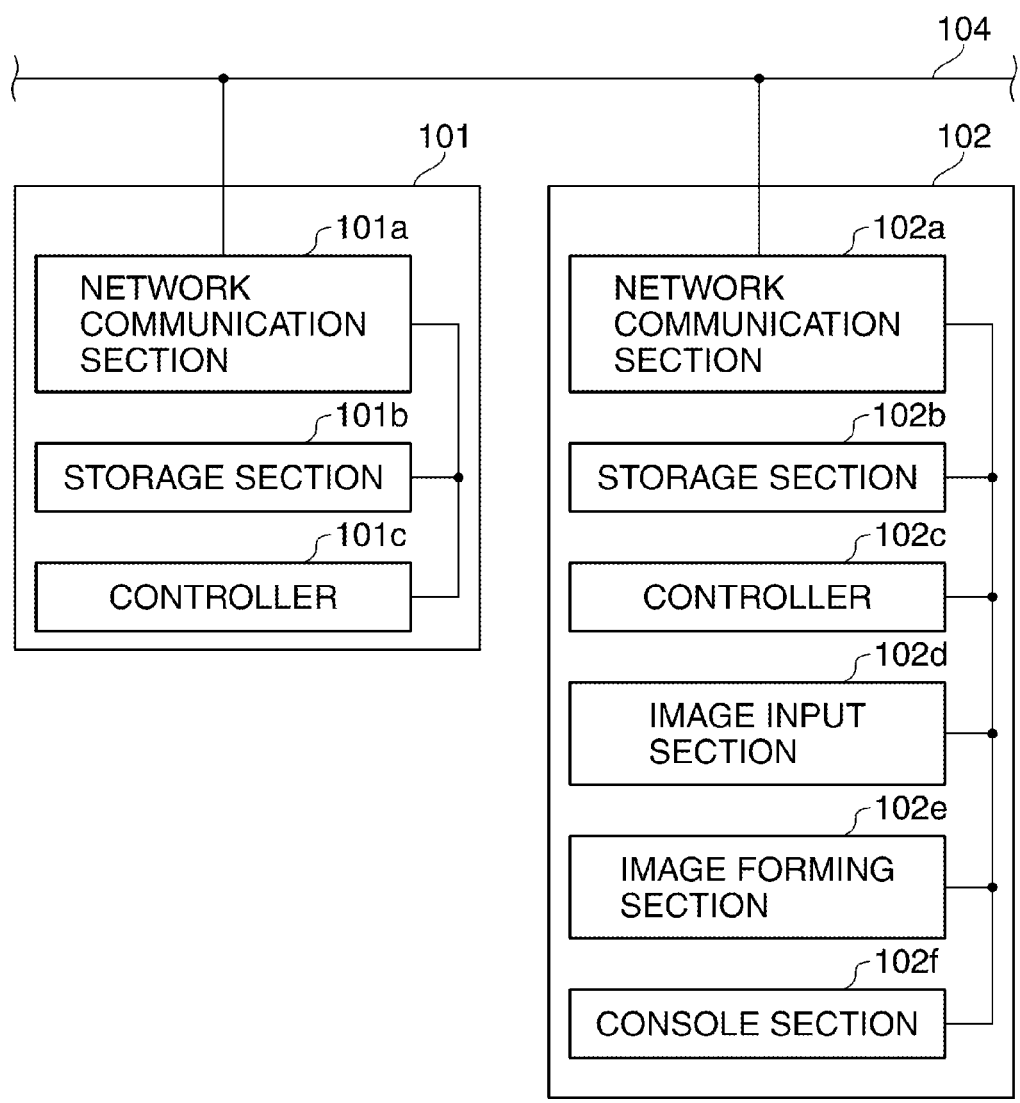
FIG. 1 is a functional block diagram of a printing system using an image forming apparatus according to an embodiment of the present invention.

FIG. 1 is a functional block diagram of a printing system using an image forming apparatus according to the embodiment of the present invention.

Referring to FIG. 1, the printing system comprises an external apparatus (hereinafter also referred to as "the information processing apparatus") 101 and an image forming apparatus 102, and the external apparatus 101 and the image forming apparatus 102 are interconnected via a network 104, such as the Internet. The external apparatus 101 is an information processing apparatus, such as a desktop PC (personal computer) or a notebook PC.

The network 104 is implemented e.g. by a wired LAN (local network area) or a wireless LAN. It should be noted that the Internet may be used as the network 104 to connect between the external apparatus 101 and the image forming apparatus 102.

The external apparatus 101 includes hardware comprising a CPU (central processing unit), a ROM (read only memory), a RAM (random access memory), and a HDD (hard disk drive) (none of which are shown in FIG. 1), for example. The CPU loads a program group stored in the HDD, image data required for each program, and web page contents into the RAM, and executes the program group.

The external apparatus 101 comprises a network communication section 101a, a storage section 101b, and a controller 101c. The network communication section 101a transmits and receives image data, web pages, etc. to and from the image forming apparatus 102 via the network 104. The network communication section 101a is implemented by a function realized e.g. by the CPU.

The storage section 101b is implemented by the ROM, the RAM, the HDD, or the like. The storage section 101b stores information on web page contents and control programs, and the like information, for example.

The controller 101c is implemented by the CPU. The controller 101c executes a control program read out from the storage section 101b. Upon receiving a web page request from the image forming apparatus 102, the controller 101c sends a requested web page to the image forming apparatus 102. Further, the controller 101c receives, from the image forming apparatus 102, settings input from the web page displayed on the image forming apparatus 102, and stores the received settings in the storage section 101b.

Further, the controller 101c stores image data received from the image forming apparatus 102 (hereinafter referred to as "image forming apparatus image data") in the storage section 101b. The controller 101c reads out settings, referred to hereinafter, and image forming apparatus image data from the storage section 101b, and performs image processing on the image forming apparatus image data according to the settings (the processed image data will be hereinafter referred to as "external apparatus image data"). Then, the controller 101c sends the external apparatus image data to the image forming apparatus 102 via the network communication section 101a.

It should be noted that as a method of communication between the external apparatus 101 and the image forming apparatus 102, there can be employed, for example, the HTTP method suitable for transmission request information for requesting a web page and reception of the web page, or the SOAP (Simple Object Access Protocol) method suitable for transmission and reception of control instructions.

Similarly to the external apparatus 101, the image forming apparatus 102 includes hardware comprising a CPU, a ROM, a RAM, and a HDD (not shown in FIG. 1). The CPU loads a program group stored in the HDD, image data required for each program, screen resources, etc. into the RAM and executes the program group.

The image forming apparatus 102 comprises a network communication section 102a, a storage section 102b, a controller 102c, an image input section 102d, an image forming section 102e, and a console section 102f.

The network communication section 102a transmits and receives image data, web pages, etc. to and from the external apparatus 101. The network communication section 102a is implemented by a function realized e.g. by the CPU.

The storage section 102b is implemented by the ROM, the RAM, the HDD, or the like. The storage section 102b stores information on control programs and the like information.

The controller 102c is implemented by the CPU, and executes a control program read out from the storage section 102b. The controller 102c displays a job configuration screen on the console section 102f, and stores settings input via the job configuration screen in the storage section 102b. Further, the controller 102c receives a web page requested of the external apparatus 101 via the network communication section 102a, displays the received web page on the console section 102f, and sends settings input on the web page to the external apparatus 101.

Upon receiving a print start instruction from the console section 102f, the controller 102c generates a print job, as described hereinafter. Then, the controller 102c stores image data read from the image input section 102d in the storage section 102b, as image forming apparatus image data.

To send image data to the external apparatus 101, the controller 102c reads the image data from the image input section 102d. The controller 102c performs image processing on the image data according to the settings input via the console section 102f, and then sends the processed image data as image forming apparatus image data to the external apparatus 101.

The controller 102c receives external apparatus image data from the external apparatus 101 via the network communication section 102a, and stores the external apparatus image data in the storage section 102b.

Alternatively, the controller 102c first sends image data read from the image input section 102d to the external apparatus 101, as image forming apparatus image data. In this case, the controller 102c performs image processing on external apparatus image data received from the external apparatus 101, and stores the processed data as image forming apparatus image data for printing.

In either case, the image forming apparatus 102 causes the image forming section 102e to form an image on a recording sheet according to the external apparatus image data or the image forming apparatus image data.

Figure 2:
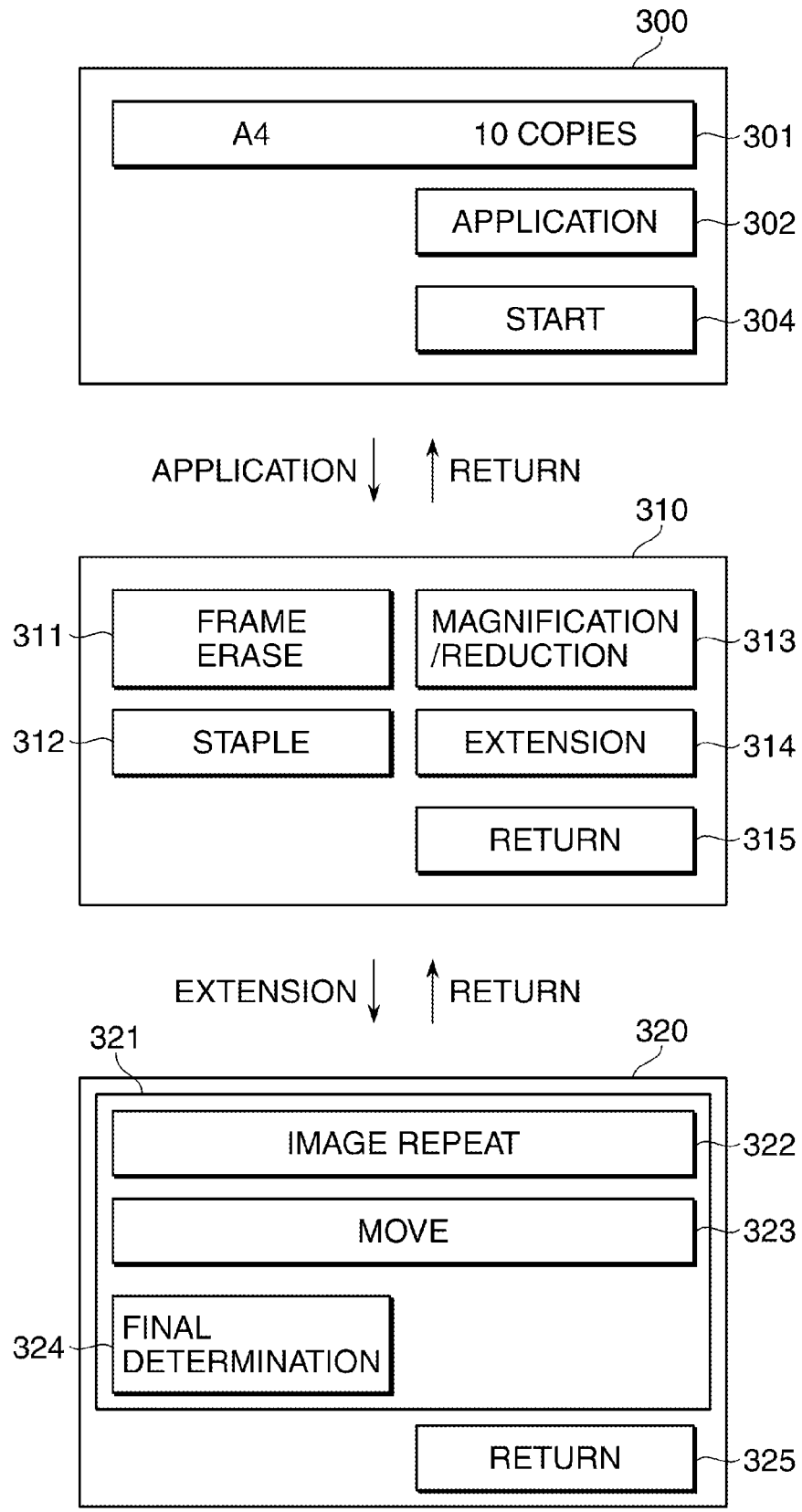
FIG. 2 is a view useful in explaining an example of a job configuration screen displayed on a console section of the image forming apparatus appearing in FIG. 1.

FIG. 2 is a view useful in explaining an example of the job configuration screen displayed on the console section 102f of the image forming apparatus 102 in FIG. 1.

Referring to FIG. 2, first, the console section 102f displays a basic screen (first configuration screen) 300 as the job configuration screen. The basic screen 300 is displayed on the console section 102f by the controller 102c before execution of printing. On the basic screen 300 are displayed a sheet & copy count display 301, an application button 302, and a start button 304.

The sheet & copy count display 301 shows a sheet size set by the user on a sheet selection screen (not shown) and the number of print copies set by the user using ten-key buttons (not shown). The illustrated example shows A4 (size) set as the sheet size, and 10 copies as the number of print copies.

The application button 302 is used to display an application mode screen 310, described hereinafter, which is a configuration screen for configuring image processing functions provided by the image forming apparatus 102 (internal image processing functions). It should be noted that the application mode screen also corresponds to the first configuration screen.

When the start button 304 is pressed on the basic screen 300, the controller 102c starts a print job.

When the application button 302 is pressed on the basic screen 300, the controller 102c displays the application mode screen 310 on the console section 102f. This application mode screen 310 is used to cause the controller 102c to read screen resources from the storage section 102b and display the read sources on the console section 102f. The user performs job configuration concerning image data input from the image input section 102d.

On the application mode screen 310 are displayed a frame erase button 311, a staple button 312, a magnification/reduction button 313, an extension button 314, and a return button 315. The frame erase button 311, the staple button 312, and the magnification/reduction button 313 are used to configure respective types of image processing using the image processing functions of the image forming apparatus 102. When a click on one of these buttons is detected, the controller 102c reads associated screen resources from the storage section 102b and displays the screen resources on the console section 102f.

When the frame erase button 311 is pressed, the controller 102c displays a frame erase detail configuration screen (not shown) on the console section 102f. The frame erase detail configuration screen enables the user to set an amount of margin in the case of adding a predetermined margin (blank area) to the outer periphery of an output image.

When the staple button 312 is pressed, the controller 102c displays a staple configuration screen (not shown) on the console section 102f. This screen enables the user to set a position for stapling and the number of staples.

When the magnification/reduction button 313 is pressed, the controller 102c displays a magnification/reduction configuration screen (not shown) on the console section 102f. This screen enables the user to select one of predetermined magnifications (standard magnification/reduction) or set a magnification in units of percentage. Settings configured on the configuration screens (internal configuration parameters) are stored in the storage section 102b by the controller 102c.

When the extension button 314 is pressed, the controller 102c displays an extension mode screen (second configuration screen) 320 on the console section 102f. Further, when the return button 315 is pressed, the controller 102c returns to the basic screen 300. That is, the controller 102c displays the basic screen 300 on the console section 102f.

The extension mode screen 320 comprises a browser screen 321. The browser screen 321 displays a web page which the controller 102c has received from the external apparatus 101, on the console section 102f. On the extension mode screen 320, job configuration is performed on the aforementioned image forming apparatus image data, for image processing to be performed by the external apparatus 101.

As shown in FIG. 2, the browser screen 321 and a return button 325 are displayed on the extension mode screen 320. The browser screen 321 displays an image repeat button 322, a move button 323, and a final determination button 324.

The display of a web page in the browser screen 321 is performed as follows: First, when a click on the extension button 314 is detected on the application mode screen 320, the controller 102c reads out a web browser stored in the storage section 102b and executes the same. Then, the controller 102c issues a web page request for requesting a web server (not shown) controlled by the controller 101c of the external apparatus 101 to send a web page to be displayed on the browser screen 321.

The web server operating in the external apparatus 101 reads out the designated web page from the storage section 101b and sends the same to the image forming apparatus 102. Upon receiving the web page, the controller 102c displays the web page on the console section 102f in the browser screen 321.

When a user input is detected on the web page screen (browser screen 321), the controller 102c sends input information (settings, etc.) to the web server of the external apparatus 101, using HTTP. The web server of the external apparatus 101 sends a different web page to the image forming apparatus 102 according to the received input information. Further, the web server stores input values (settings: also referred to as external configuration parameters) in the storage section 101b.

The image repeat button 322 and the move button 323 appearing in FIG. 2 are used to perform job configuration on the web page. When the image repeat button 322 is pressed, the controller 102c displays a web page (not shown) as an image repeat configuration screen on the console section 102f. The user can use the image repeat configuration screen to set the numbers of images to be repeated in the main scanning direction and the sub scanning direction, respectively.

When the move button 323 is pressed, the controller 102c displays a web page (not shown) as a move configuration screen on the console section 102f. The user can use the move configuration screen to set a position on a recording sheet where image data is to be printed, by selecting the position e.g. from a central position, an upper right position, an upper left position, a lower right position, and a lower left position. Settings configured on the web pages are stored in the storage section 101b of the external apparatus 101.

When the final determination button 324 is pressed, a final determination signal is sent from the controller 102c to the external apparatus 101, and the external apparatus 101 finally determines the results of the job configuration performed on the web pages. Further, when the return button 325 is pressed, the controller 102c terminates the web browser and displays the application mode screen 310 on the console section 102f.

As described above, job configuration for configuring image processing to be executed by the external apparatus 101 is performed on a job configuration screen formed by a web page displayed on the console section 102f of the image forming apparatus 102, using screen resources provided in the external apparatus 101. The thus configured settings are stored in the storage section 101b of the external apparatus 101.

Thus, extension functions provided by the external apparatus 101 can be executed independently of the image forming apparatus 102. The extension functions provided by the external apparatus 101 include not only the external image processing functions but also functions for upgrading a control program e.g. for a new image processing function or for addition of an input configuration to an existing image processing function, and for upgrading a web page.

Further, the displayed screen is shifted from a configuration screen associated with functions of the image forming apparatus 102 (internal image processing functions) to a configuration screen associated with functions of the external apparatus 101 (external image processing functions). This enables the user to be easily aware that the sequence of operations being performed is for configuring a single print job.

Figure 3:
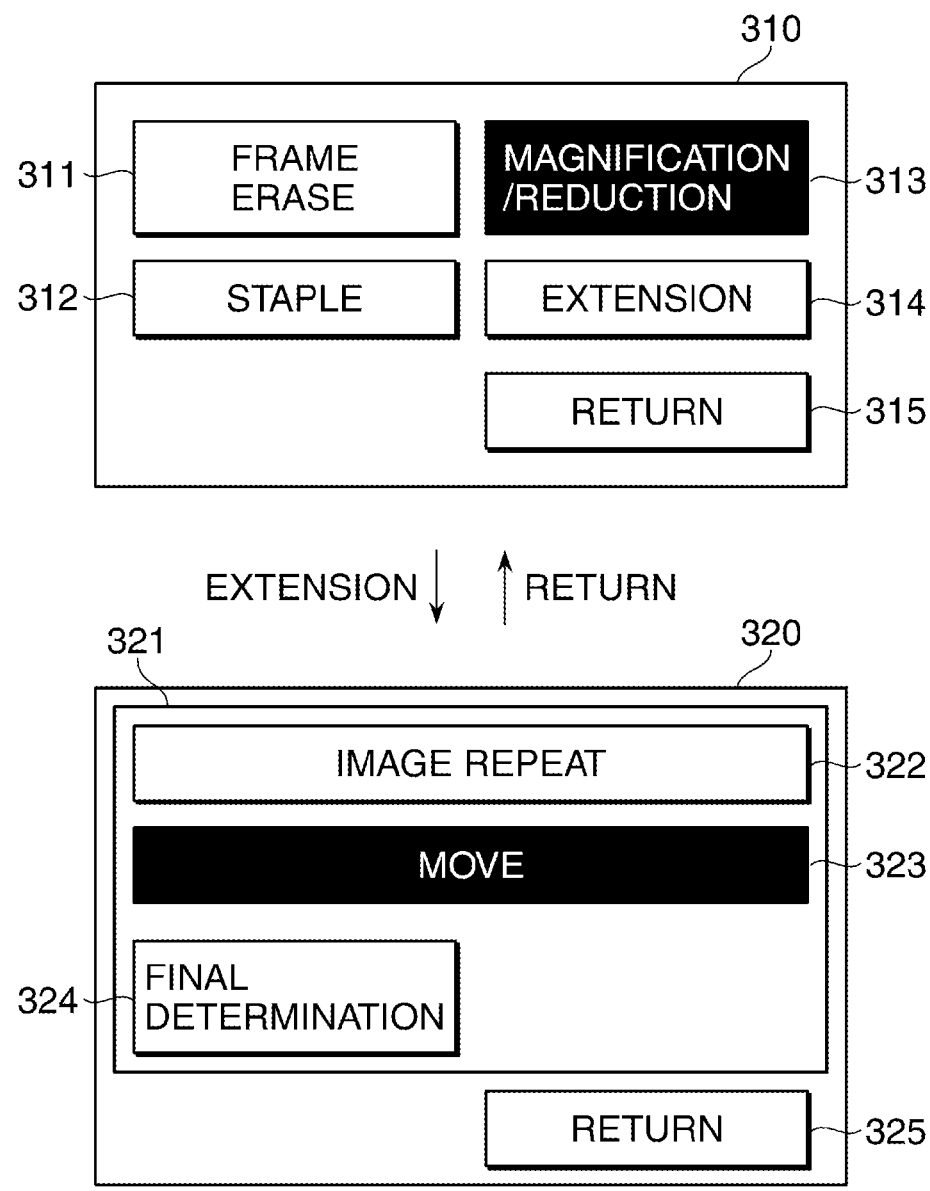
FIG. 3 is a view useful in explaining an example of job configuration performed on the job configuration screen in FIG. 2.

FIG. 3 is a view useful in explaining an example of job configuration performed on the job configuration screen in FIG. 2.

Referring to FIG. 3, in the following description, it is assumed that configuration has been performed under the following conditions: The magnification/reduction button 313 has been pressed on the application mode screen 310, and the move button 323 has been pressed on the extension mode screen 320. It should be noted that in a case where there is a combination of settings of magnification/reduction and move, normally, the image forming apparatus 102 performs magnification (enlargement) processing, and the external apparatus 101 performs move processing.

However, when magnification (enlargement) processing is performed by the image forming apparatus 102, the size of image data is increased. As a result, it takes a longer time period to transfer the resulting image forming apparatus image data to the external apparatus 101. Therefore, it is efficient to transfer image data yet to be subjected to image processing from the image forming apparatus 102 to the external apparatus 101 and cause the external apparatus 101 to perform both the magnification processing and the move processing. That is, this can reduce time required to transfer the image forming apparatus image data.

It should be noted that a description will be given hereinafter of determination as to whether or not to substitute a function of the image forming apparatus 102 by a function of the external apparatus 101, exchange of information required for the determination, and control processes therefor.

Figure 4A:
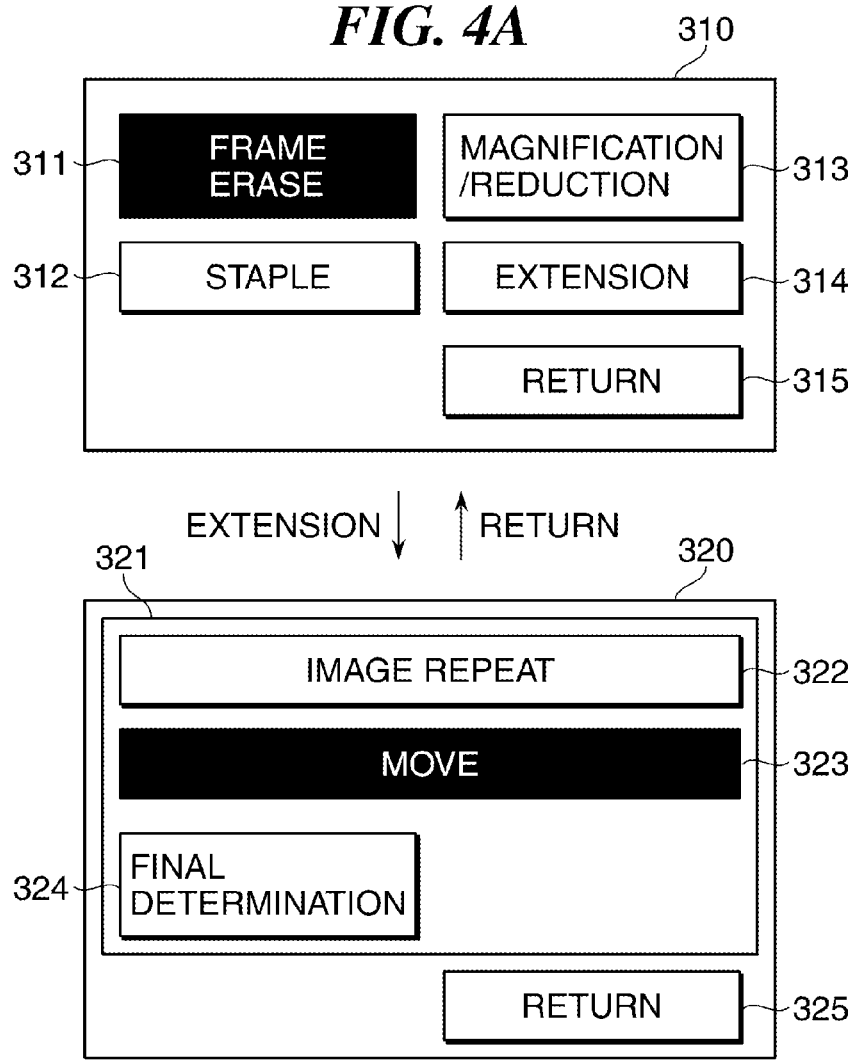
FIG. 4A is a view useful in explaining another example of job configuration performed on the job configuration screen in FIG. 2.
Figure 4B:
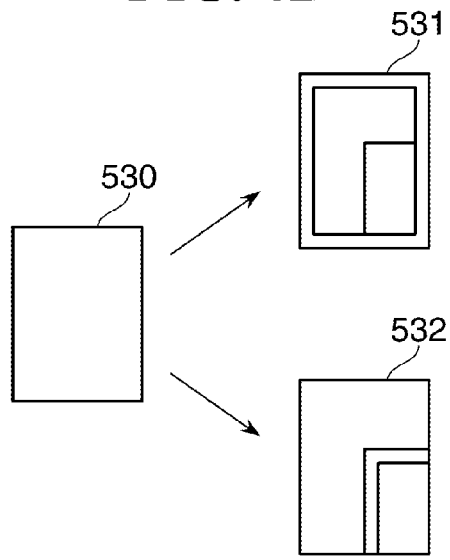
FIG. 4B is a view illustrating different results of processing of a job configured on the job configuration screen in FIG. 2.

FIGS. 4A and 4B are views useful in explaining another example of job configuration performed on the job configuration screen in FIG. 2. FIG. 4A shows job configuration performed on the job configuration screen, and FIG. 4B is a view illustrating different results of processing of a configured job.

Referring to FIGS. 4A and 4B, it is assumed in the following description that configuration has been performed under the following conditions: The frame erase button 311 has been pressed on the application mode screen 310, and the move button 323 has been pressed on the extension mode screen 320 (see FIG. 4A). In this case, if there is such a combination of settings of frame erase and move, an output image basically becomes unpredictable. More specifically, if the image processing sequence is such that the frame erase processing is executed by the image forming apparatus 102 first, and then the move processing is executed by the external apparatus 101, generally, an input image 530 is output as an output image 532 (see FIG. 4B).

On the other hand, if the image processing sequence is such that the move processing is executed by the external apparatus 101 first, and then the frame erase processing is executed by the image forming apparatus 102, generally, the input image 530 is output as an output image 531 (see FIG. 4B).

If an output image is different (unpredictable) depending on the image processing sequence as described above, this can produce a result unexpected by the user. Therefore, as one solution to this problem, it can be envisaged to prohibit the above-mentioned combination of settings of image processing.

However, if move processing and frame erase processing are both performed by the external apparatus 101, the unpredictability mentioned above can be eliminated. More specifically, if the external apparatus 101 determines a processing sequence of the two types of image processing and performs image processing on behalf of the image forming apparatus 102, without causing the image forming apparatus 102 to perform them, it is possible to prevent an output image from becoming unpredictable.

As mentioned above, the determination as to whether or not to substitute a function of the image forming apparatus 102 by a function of the external apparatus 101, the exchange of information required for the determination, and the control processes therefor, will be described in detail hereinafter.

Figure 5A:
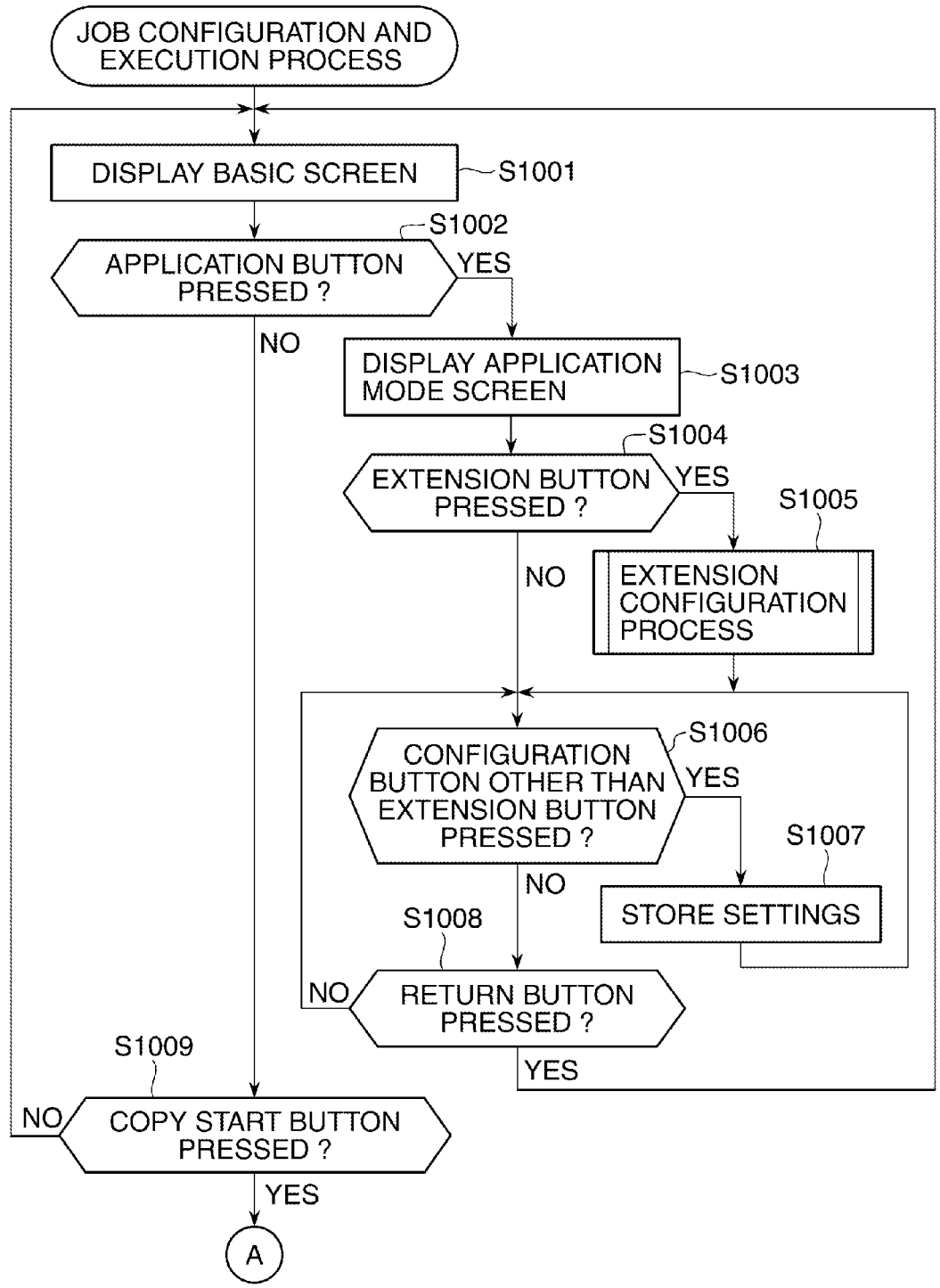
FIG. 5A is a flowchart of a job configuration and execution process executed by the image forming apparatus in FIG. 1.
Figure 5B:
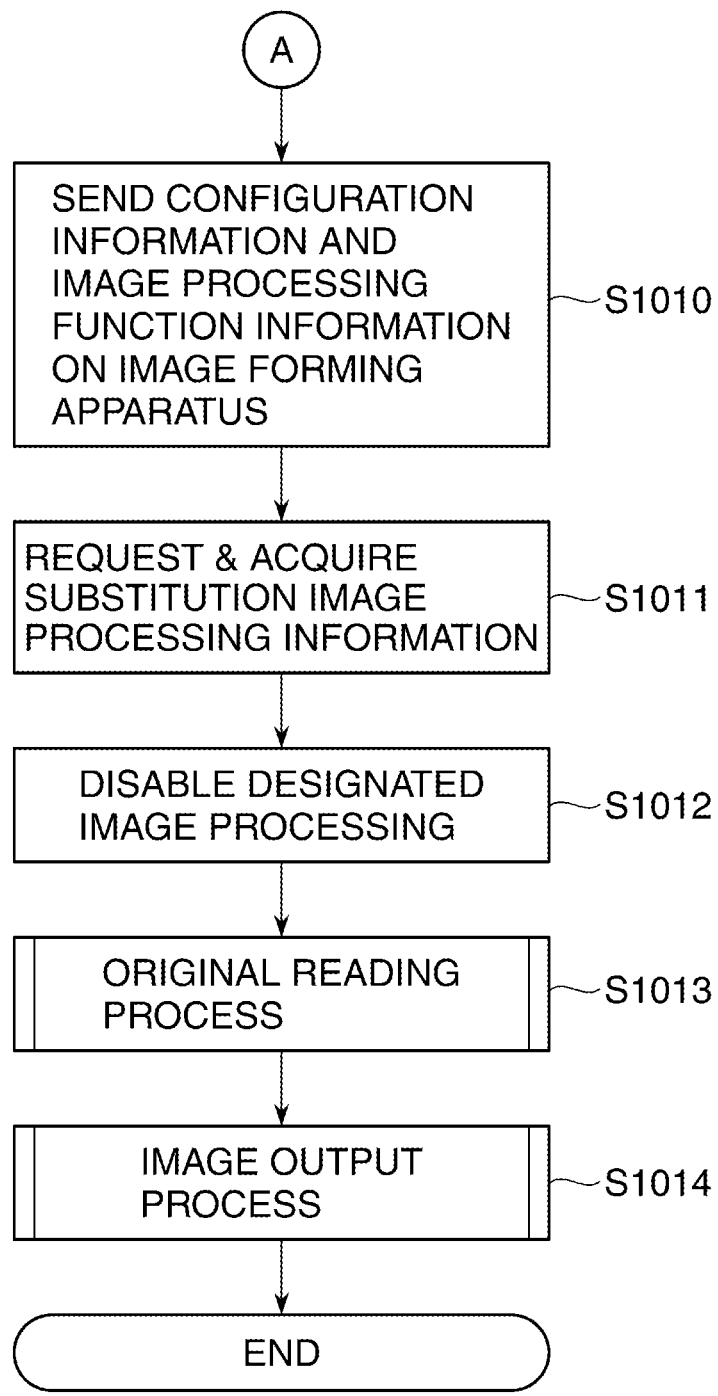
FIG. 5B is a continuation of FIG. 5A.

FIGS. 5A and 5B are a flowchart of a job configuration and execution process executed by the image forming apparatus 102 in FIG. 1.

Referring to FIGS. 1, 2, 5A and 5B, when job configuration is started, the controller 102c displays the basic screen 300 on the console section 102f as described hereinbefore (step 1001). Then, the controller 102c determines whether or not the application button 302 has been pressed on the basic screen 300 (step S1002).

If the application button 302 has been pressed (YES to the step S1002), the controller 102c reads out the application mode screen 310 from the storage section 102b and displays the same on the console section 102f (step S1003). Then, the controller 102c determines whether or not the extension button 314 has been pressed (step S1004).

If the extension button 314 has been pressed (YES to the step S1004), the controller 102c displays the above-described extension mode screen 320 on the console section 102f. Thereafter, an extension configuration process is performed on the above-mentioned web page (step S1005).

Then, the controller 102c determines whether or not a button other than the extension button 314, for setting a function of the image forming apparatus 102 (hereinafter referred to as "another button") has been pressed (step S1006). If another button (e.g. the staple button 312) has been pressed (YES to the step S1006), the controller 102c displays the staple configuration screen mentioned with reference to FIG. 3. Then, the controller 102c stores settings (in the present example, staple settings) in the storage section 102b (step S1007), and then returns to the step S1006.

On the other hand, if another button has not been pressed (NO to the step S1006), the controller 102c determines whether or not the return button 315 has been pressed (step S1008). If the return button 315 has been pressed (YES to the step S1008), the controller 102c returns to the step S1001. On the other hand, if the return button 315 has not been pressed (NO to the step S1008), the controller 102c returns to the step S1006.

Thus, when the application button 302 is pressed in the step S1002, the controller 102c can perform configuration associated with a function provided in the image forming apparatus 102, and on an as-needed basis, configuration associated with a function of the external apparatus using a web page.

If it is determined in the step S1002 that the application button 302 has not been pressed (NO to the step S1002), the controller 102c determines whether or not the copy start button (i.e. the start button 304) has been pressed (step S1009). If the start button 304 has not been pressed (NO to the step S1009), the controller 102c returns to the step S1001.

On the other hand, if the start button 304 has been pressed (YES to the step S1009), the controller 102c sends configuration information and image processing function information concerning the image forming apparatus 102, stored in the storage section 102b, to the external apparatus 101, as image forming apparatus information (step S1010).

This image forming apparatus information is used along with configuration information and image processing function information which the external apparatus 101 stores in the storage section 101b, to determine whether or not image processing is to be collectively performed by the external apparatus 101. That is, the external apparatus 101 determines, based on these pieces of information, whether or not image processing to originally be executed by the image forming apparatus 102 is to be executed by the external apparatus 101 on behalf of the image forming apparatus 102.

Then, the controller 102c requests the external apparatus 101 to check whether or not there is substation image processing (i.e. image processing to be executed by the external apparatus 101 on behalf of the image forming apparatus 102). Then, the controller 102c receives a result of the check (i.e. substation image processing information) from the external apparatus 101 (step S1011).

If the check result designates a function to be disabled, i.e. if the external apparatus 101 is to execute any image processing on behalf of the image forming apparatus 102, the controller 102c disables an image processing function associated with the image processing (step S1012).

Next, the controller 102c executes an original reading process to thereby cause the image input section 102d to read an original, and store image data obtained by reading the original in the storage section 102b (step S1013).

Then, the controller 102c executes an image output process to thereby cause the image forming section 102e to perform printing according to the image data read out from the storage section 102b (step S1014), followed by terminating the print processing.

Although in the above-described example, when the copy start button is pressed in the step S1009, the controller 102c requests the external apparatus 101 to check for substitution image processing (i.e. function(s) to be disabled), this request may be issued in timing different from this. For example, the request may be issued in timing of closing the web page.

FIG. 6 is a flowchart of the extension configuration process executed in the step S1005 in FIG. 5A.

Referring to FIGS. 1, 2, and 6, when the extension button 314 is pressed in the step S1004 mentioned with reference to FIG. 5A (YES to the step S1004 in FIG. 5A), the controller 102c proceeds to the extension configuration process mentioned in the step S1005 (i.e. the extension configuration process in FIG. 6 is started). First, the controller 102c displays the extension mode screen 320 on the console section 102f (step S1100). Then, the controller 102c starts the web browser (step S1101), and requests the web server operating in the external apparatus 101 to send a starting web page for use in extension configuration. Then, the controller 102c displays the web page received in response to the request as the browser screen 321 (step S1102).

Thereafter, the controller 102c determines whether or not an input for extension mode configuration has been made on the browser screen 321 (step S1103). The input for extension mode configuration corresponds to a click on the image repeat button 322 or the move button 323 appearing in FIG. 2, for example.

If an input for extension mode configuration has been made (YES to the step S1103), the controller 102c acquires a web page corresponding to the pressed button from the external apparatus 101.

In the following description, it is assumed that the image repeat button 322 has been pressed as an input for extension mode configuration. When the image repeat button 322 is pressed, the controller 102c requests the external apparatus 101 to send a web page of the image repeat configuration screen. Then, the controller 102c displays the web page of the image repeat configuration screen provided in response to the request in the browser screen 321.

After configuration for image repeat is performed on the image repeat configuration screen, the controller 102c sends settings (image repeat settings) to the external apparatus 101.

Thus, the controller 102c receives the web page from the external apparatus 101 and transmits the parameters (settings) to the external apparatus 101 (step S1104). When the transmission and reception is completed in the step S1104, the controller 102c returns to the step S1103, and determines whether or not another input for extension mode configuration has been made.

On the other hand, if another input for extension mode configuration has not been made (NO to the step S1103), the controller 102c determines whether or not an extension mode configuration identifier, referred to hereinafter, has been received from the external apparatus 101 (step S1105).

If an extension mode configuration identifier has been received (YES to the step S1105), the controller 102c stores the extension mode configuration identifier in the storage section 102b (step S1106). On the other hand, if no extension mode configuration identifier has been received (NO to the step S1105), the controller 102c determines whether or not the return button 325 has been pressed. More specifically, the controller 102c determines whether or not the extension mode configuration has been completed (step S1107).

If the return button 325 has been pressed (YES to the step S1107), the controller 102c terminates the web browser (step S1108), and switches the screen from the extension mode screen 320 to the application mode screen 310 (step S1109). On the other hand, if the return button 325 has not been pressed (NO to the step S1107), the controller 102c returns to the step S1103, and continues the process.

Figure 7:
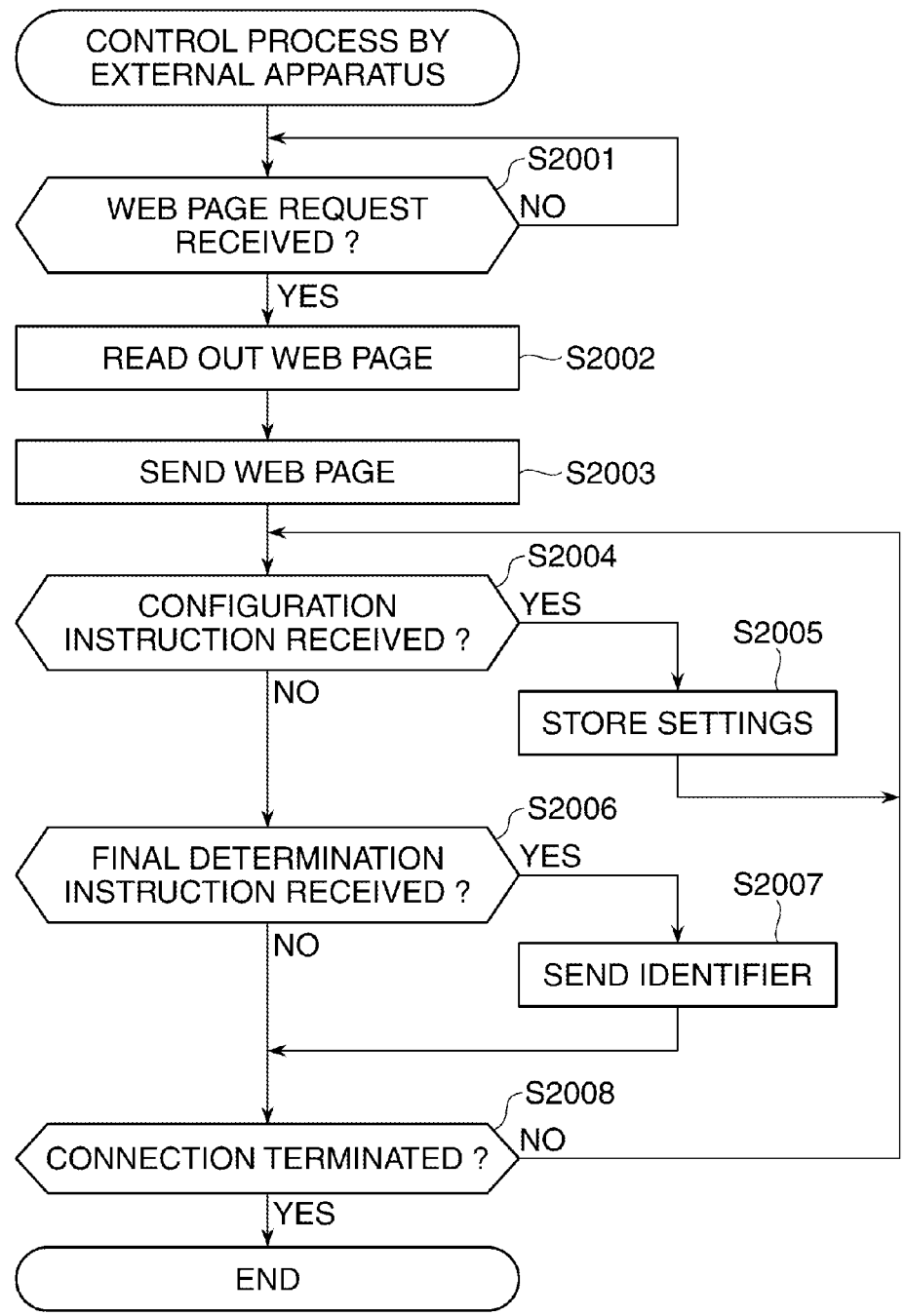
FIG. 7 is a flowchart of a control process executed by an external apparatus appearing in FIG. 1.

FIG. 7 is a flowchart of a control process executed by the external apparatus 101 appearing in FIG. 1.

Referring to FIGS. 1 and 7, the controller 101c determines whether or not a request for a web page has been received from the image forming apparatus 102 (step S2001). If a request for a web page has not been received (NO to the step S2001), the controller 101c awaits reception of a request for a web page.

On the other hand, if a request for a web page has been received (YES to the step S2001), the controller 101c reads out a starting web page for use in extension configuration from the storage section 101b (step S2002). Then, the controller 101c sends the web page to the image forming apparatus 102 (step S2003).

Next, the controller 101c determines whether or not an event on the web page has been received from the image forming apparatus 102 (configuration instruction: step S2004). In the example shown in FIG. 2, a click on the image repeat button 322 or the move button 323 corresponds to the event.

In the present example, it is assumed that the image repeat button 322 has been pressed. If an event corresponding to a click on the image repeat button 322 has been received (YES to the step S2004), the controller 101c sends the web page of the image repeat configuration screen to the image forming apparatus 102. Then, the controller 101c receives image repeat settings configured in the image forming apparatus 102 to stores the image repeat settings as job settings in the storage section 101b (step S2005), and then returns to the step S2004.

If an event corresponding to a click on either the image repeat button 322 or the move button 323 has not been received (NO to the step S2004), the controller 101c proceeds to the step S2006 to determine whether or not an event corresponding to a click on the final determination button 324 has been received from the image forming apparatus (determination instruction).

If an event corresponding to a click on the final determination button 324 has been received (YES to the step S2006), the controller 101c assigns an identifier (job configuration identifier) to the job settings stored in the storage section 101b in the step S2005, for identification thereof. Then, the controller 101c stores the identifier in the storage section 101b and sends the same to the image forming apparatus 102 (step S2007), and then the controller proceeds to a step S2008.

If an event corresponding to a click on the final determination button 324 has not been received (NO to the step S2006), the controller 101c directly proceeds to the step S2008 to determine whether or not the connection has been terminated.

If the connection has not been terminated (NO to the step S2008), the controller 101c returns to the step S2004 to continue the present process. On the other hand, if the connection has been terminated (YES to the step S2008), the controller 101c terminates the process.

Figure 8:
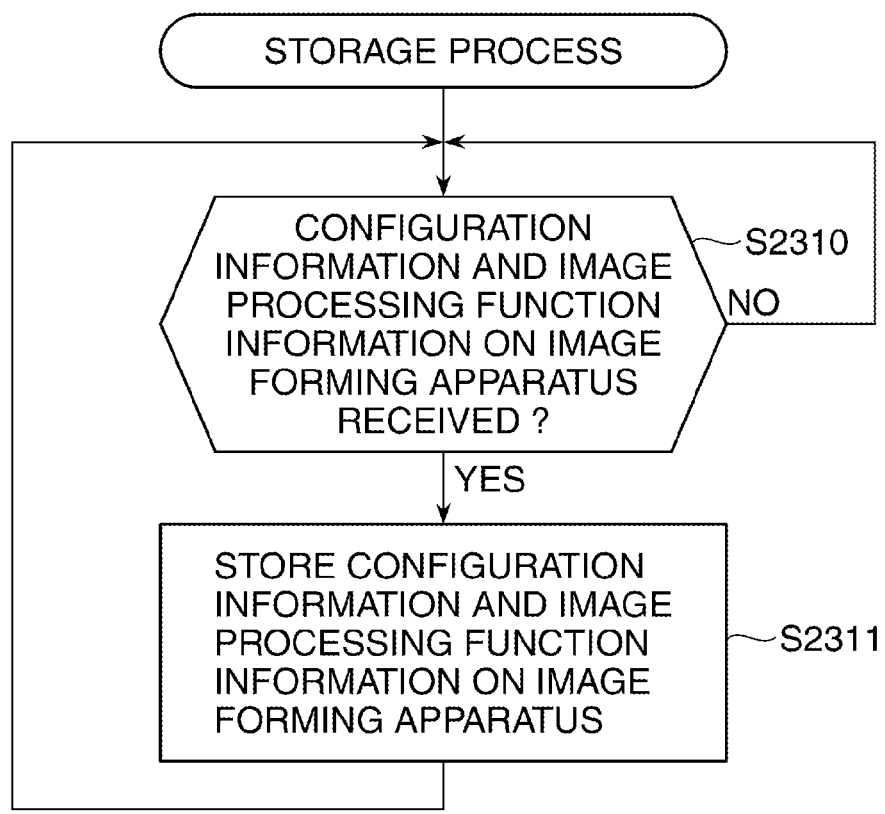
FIG. 8 is a flowchart of a storage process for storing information on the image forming apparatus in the external apparatus appearing in FIG. 1.

FIG. 8 is a flowchart of a storage process for storing information on the image forming apparatus 102 in the external apparatus 101 appearing in FIG. 1.

Referring to FIGS. 1 and 8, the storage process shown in FIG. 8 is executed by the controller 101c which reads out and starts a program of the process stored in the storage section 101b, immediately after the start of the external apparatus 101.

First, the controller 101c determines whether or not the image forming apparatus information (the configuration information and image processing function information concerning the image forming apparatus 102) sent in the step S1010 of the job configuration and execution process in FIG. 5B by the image forming apparatus 102 has been received (step S2310). If the image forming apparatus information has been received (YES to the step S2310), the controller 101c stores the same as received data in the storage section 101b, and then returns to the step S2310. On the other hand, if the image forming apparatus information has not been received (NO to the step S2310), the controller 101c awaits reception of the request.

FIGS. 9A and 9B are diagrams useful in explaining details of received data mentioned in the storage process in FIG. 8. FIG. 9A shows an example of the configuration information concerning the image forming apparatus 102, and FIG. 9B shows an example of the image processing function information indicative of image processing functions of the image forming apparatus 102.

As shown in FIG. 9A, a plurality of configuration items (functions) are set in the configuration information. In the present example, there are set "number of copies", "magnification/reduction", "frame erase", and "staple" as the configuration items. The configuration information shows whether or not the setting of associated configuration item is valid for the image forming apparatus 102. In the example shown in FIG. 9A, a case where a setting is valid is represented by a symbol of circle, and a case where a setting is invalid is represented by a symbol of cross.

Further, for configuration items concerning image processing, an image processing method is defined on a configuration item-by-configuration item basis. More specifically, an ID indicative of an image processing function to be used by the image forming apparatus 102 is defined. Furthermore, a setting (detailed configuration parameter) is defined in association with each configuration item.

As shown in FIG. 9B, in the image processing function information, IDs associated with respective image processing functions are defined, and an image processing function and a detailed parameter are set in association with each of the IDs. In the illustrated example, IDs 1 to 4 are assigned to the respective image processing functions of "magnification/reduction", "trimming", "image synthesis", and "density adjustment". Further, "algorithm 1", "none", "including a blend function", and "9 levels" are defined as detailed parameters in association with the IDs, respectively.

It should be noted that the image processing function information is static information independent of user's configuration and hence may be sent to the external apparatus 101 in any desired appropriate timing, e.g. at the start of the image forming apparatus 102. Further, the model name of the image forming apparatus 102 may be sent to the external apparatus 101 so that the external apparatus 101 can use the model name as a key to perform a search as to what image processing functions are provided in the designated image forming apparatus.

Figure 10:
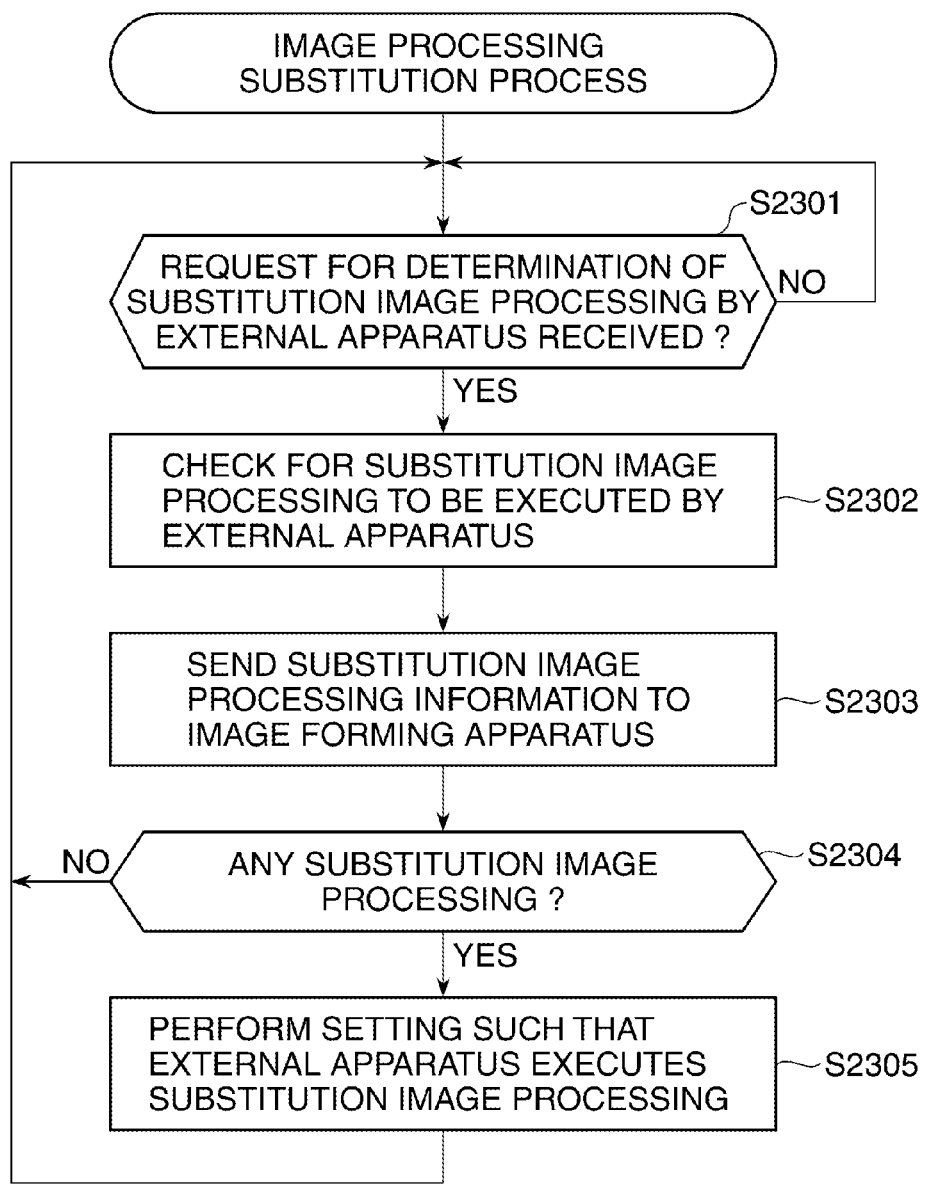
FIG. 10 is a flowchart of an image processing substitution process executed by the external apparatus in FIG. 1.

FIG. 10 is a flowchart of an image processing substitution process executed by the external apparatus 101 in FIG. 1.

Referring to FIGS. 1 and 10, the image processing substitution process in FIG. 10 is executed by the controller 101c which reads out and starts a program of the process stored in the storage section 101b, immediately after the start of the external apparatus 101.

The controller 101c determines whether or not a determination request sent from the image forming apparatus 102 in the step S1011 of the job configuration and execution process in FIG. 5B, for determining image processing (substitution image processing) to be performed by the external apparatus 101 on behalf of the image forming apparatus 102 has been received (step S2301). If the determination request has not been received (NO to the step S2301), the controller 101c awaits reception of the determination request.

On the other hand, if the determination request has been received (YES to the step S2301), the controller 101c reads out the received data and the configuration information and the image processing function information stored in the external apparatus 101, each described with reference to FIG. 8, from the storage section 101b, as read-out data. Further, the controller (determination unit) 101c checks for substitution image processing based on the read-out data, using determination condition information stored in the storage section 101b in advance (step S2302).

FIGS. 11A to 11C are diagrams showing examples of the determination condition information stored in the storage section 101b appearing in FIG. 1. FIG. 11A shows an example of a first condition information table, FIG. 11B shows an example of a second condition information table, and FIG. 11C shows an example of a third condition information table.

The determination condition information is stored in advance in the storage section 101b, as mentioned above. The first condition information table in FIG. 11A defines, as the first condition information, whether substitution image processing is permitted or not concerning cases where the amount of image data can change if image processing is performed by the image forming apparatus 102.

The second condition information table in FIG. 11B defines, as second condition information, for cases where if one of each combination of two types of image processing is executed by the image processing apparatus 102, an image output result cannot be definitely determined, combinations of types of image processing in which both types of image processing are to be executed by the external apparatus 101 setting the one of the combination as substitution image processing. Further, the third condition information table FIG. 11C defines, as third condition information, cases where image quality is more improved when image processing is performed by the external apparatus 101 than when image processing is performed by the image forming apparatus 102.

In the example shown in FIG. 11A, in the first condition information table, magnification/reduction is defined as an image processing function of the image forming apparatus 102, and detailed parameters are set for the magnification/reduction. Further, whether substitution image processing is permitted or not permitted is defined in association with each of the detailed parameters. In the present example, "permitted" is represented by a symbol of circle, and "not permitted" is represented by a symbol of cross.

It should be noted that in performing the determination using the first condition information table, it is preconditioned that some other image processing is to be also performed by the external apparatus 101.

If it is determined in the step S2302, based on the configuration information and the image processing function information shown in FIGS. 9A and 9B, that the setting of image processing concerning the magnification/reduction is valid, the controller 101c checks the detailed parameters associated therewith. Then, the controller 101c determines, according to the result of the check, whether or not substitution processing is to be performed by the external apparatus 101.

In the example shown in FIG. 11A, since 100% magnification is designated in the configuration information (FIG. 9A), this condition matches a condition of a detailed parameter of 100% or less in the first condition information table in FIG. 11A. In this case, the controller 101c determines, depending on whether or not the first condition information table indicates permission of the substitution image processing, whether or not the external apparatus 101 is to perform the magnification/reduction on behalf of the image forming apparatus 102. In the present example, the symbol of cross is set for the substitution image processing for magnification/reduction, and therefore the controller 101c determines that the substitution image processing is not to be performed.

In the example shown in FIG. 11B, the second condition information table defines types of image processing to be executed by the external apparatus 101 and types of image processing to be executed by the image forming apparatus 102. Image repeat and move are set as the types of image processing to be executed by the external apparatus 101, whereas magnification/reduction and trimming are set as types of image processing to be executed by the image forming apparatus 102. In the present example as well, in each combination of a type of processing to be executed by the external apparatus 101 and a type of image processing to be executed by the image forming apparatus 102, if the image processing to be executed by the image forming apparatus 102 is to be executed by the external apparatus 101 on behalf of the image forming apparatus 102, a symbol of circle is set, and otherwise, a symbol of cross is set.

If it is determined in the step S2302, based on the configuration information and the image processing function information shown in FIGS. 9A and 9B, that the setting of image processing concerning trimming is valid, the controller 101c checks combination with a type of image processing to be executed by the external apparatus 101.

For example, as described with reference to FIGS. 4A and 4B, when "move" is designated for the external apparatus 101, the output image becomes unpredictable. For this reason, it is desirable that trimming is also performed by the external apparatus 101.

As shown in FIG. 11B, in the present example, settings are configured such that in the case of a combination of "trimming" to be executed by the image forming apparatus 102 and "move" to be executed by the external apparatus 101, "trimming" to be executed by the image forming apparatus 102 is to be executed by the external apparatus 101 on behalf of the image forming apparatus 102. Therefore, the controller 101c determines that substitution processing for "trimming" is to be performed by the external apparatus 101.

In the example shown in FIG. 11C, the third condition information table defines an image processing function of the image forming apparatus 102, detailed parameters, and substitution processing. In the example shown in FIG. 11C, "magnification/reduction" is defined as an image processing function of the external apparatus, and a plurality of detailed parameters are defined in association with the "magnification/reduction". Further, whether or not substitution processing is permitted is defined in association with each of the detailed parameters. In the present example as well, "permitted" is represented by a symbol of circle, and "not permitted" is represented by a symbol of cross.

It should be noted that in determination performed using the third condition information table, it is assumed that some other image processing is also performed by the external apparatus 101.

If it is determined in the step S2302, based on the configuration information and the image processing function information shown in FIGS. 9A and 9B, that the image processing function associated with magnification/reduction is valid, the controller 101c checks the detailed parameters associated therewith. Then, the controller 101c determines, according to the result of the check, whether or not substitution processing is to be performed by the external apparatus 101.

In the example shown in FIG. 11C, since the image processing function information (FIG. 9B) defines that "Algorithm 1" is used in processing for magnification/reduction, the controller 101c determines from the third condition information table that substitution processing is permitted for "Algorithm 1".

For example, when "Algorithm 1" is inferior in accuracy to the magnification processing function of the external apparatus 101, it is more advantageous to perform magnification processing in the external apparatus 101.

Referring again to FIGS. 1 and 10, the check result obtained by the check performed in the step S2302 is sent as the substation image processing information mentioned in the step S1011 of the job configuration and execution process in FIG. 5B to the image forming apparatus 102 by the controller 101c (step S2303). It should be noted that this check result is in the form of data which is formed based on the configuration information shown in FIG. 9A and by adding information of "valid" to an image processing function associated with each type of image processing not to be executed by the external apparatus 101 on behalf of the image forming apparatus 102 and "invalid" to an image processing function associated with each type of image processing to be executed as substitution image processing by the external apparatus 101 on behalf of the image forming apparatus 102.

Next, the controller 101c determines, according to the check result, whether or not there is substitution image processing to be executed by the external apparatus 101 (step S2304). If there is any substitution image processing to be executed by the external apparatus 101 (YES to the step S2304), the controller 101c performs setting such that the external apparatus 101 executes the substitution image processing (step S2305). More specifically, the controller 101c stores a setting associated with the substitution image processing in the storage section 101b for the external apparatus 101 to perform the substitution image processing. Then, the controller 101c returns to the step S2301.

It should be noted that if there is no substation image processing to be executed by the external apparatus 101 (NO to the step S2304), the controller 101c returns to the step S2301.

Figure 12:
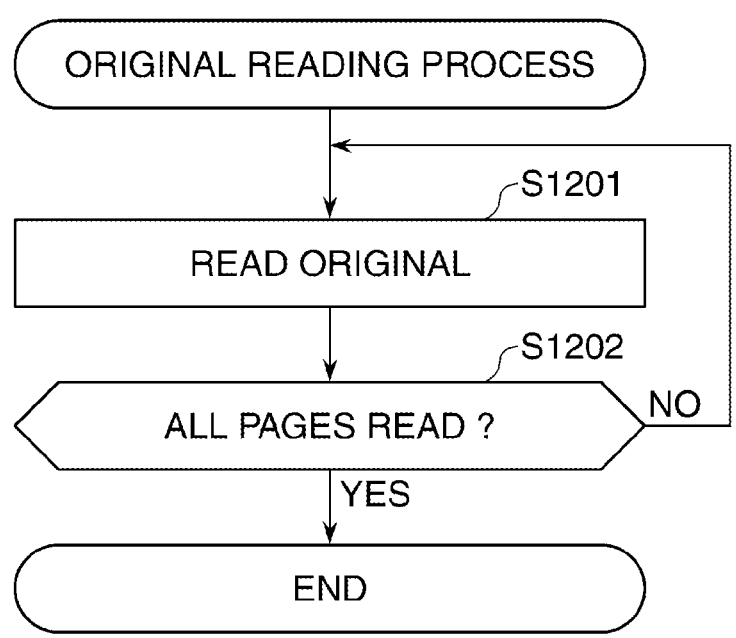
FIG. 12 is a flowchart of an original reading process executed in a step in FIG. 5B.

Now, a description will be given of original reading control by the image forming apparatus 102. FIG. 12 is a flowchart of the original reading process executed in the step S1013 in FIG. 5B.

Referring to FIGS. 1 and 12, when the original reading process is started, the controller 102c controls the image input section 102d to start reading an original, i.e. a document. Then, the controller 102c stores image data obtained by reading the original, in the storage section 102b (step S1201).

Then, the controller 102c determines whether or not the last page of the original has been read, i.e. whether or not all of the original has been read (step S1202). If not all of the original has been read (NO to the step S1202), the controller 102c returns to the step S1201. On the other hand, if all of the original has been read (YES to the step S1202), the controller 102c terminates the original reading process.

Figure 13:
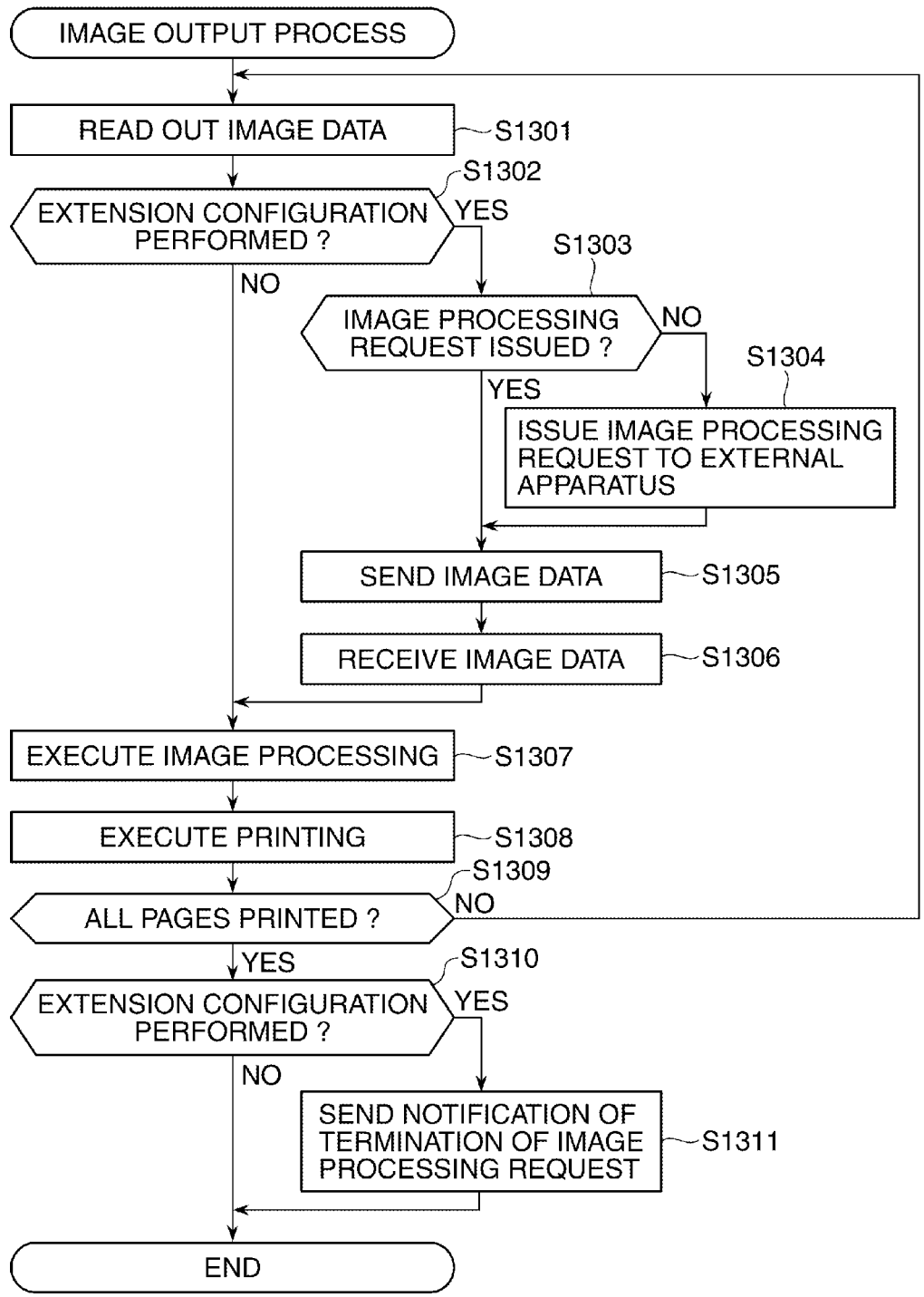
FIG. 13 is a flowchart of an image output process executed in a step in FIG. 5B.

Next, a description will be given of image output control by the image forming apparatus 102. FIG. 13 is a flowchart of the image output process executed in the step S1014 in FIG. 5B.

Referring to FIGS. 1 and 13, when the image output process is started, the controller 102c reads out image data from the storage section 102b (step S1301). Then, the controller 102c determines whether or not the aforementioned identifier is stored in the storage section 102b. More specifically, the controller 102c determines whether or not the extension configuration has been performed (step S1302). If extension configuration has been performed (YES to the step S1302), the controller 102c determines whether or not an image processing request has been issued to the external apparatus 101 (step S1303).

If the image processing request has not been issued (NO to the step S1303), the controller 102c sends the identifier read out from the storage section 102b to the external apparatus 101, and makes an image processing request (step S1304). Then, the controller 102c reads out image data from the storage section 102b and sends the image data as image forming apparatus image data to the external apparatus 101 (step S1305).

It should be noted that if the image processing request has been issued (YES to the step S1303), the controller 102c directly proceeds to the step S1305.

The controller 102c receives image data subjected to image processing by the controller 101c from the external apparatus 101, as external apparatus image data (step S1306). Then, the controller 102c performs image processing on the external apparatus image data based on the settings referred to in the step S1007 in FIG. 5A (step S1307). In the present example, image processing for "move" is performed.

If extension configuration has not been performed (NO to the step S1302), the controller 102c directly proceeds to the step S1307, and carries out image processing without using the external apparatus 101.

Next, the controller 102c controls the image forming section 102e to perform printing according to the processed image data (step S1308). Then, the controller 102c determines whether or not printing of all the pages of the processed image data has been completed (step S1309).

If printing of all the pages has not been completed (NO to the step S1309), the controller 102c returns to the step S1301 to continue the process.

On the other hand, if printing of all the pages has been completed (YES to the step S1309), the controller 102c determines again whether or not the identifier is stored in the storage section 102b. More specifically, the controller 102c determines whether or not extension configuration has been performed (step S1310).

If extension configuration has been performed (YES to the step S1310), the controller 102c notifies the external apparatus 101 of termination of the image processing request (step S1311), followed by terminating the image output process. On the other hand, if no extension configuration has been performed (NO to the step S1310), the controller 102c immediately terminates the image output process.

Next, a description will be given of image processing by the external apparatus 101. FIG. 14 is a flowchart of an image processing process executed by the external apparatus 101 appearing in FIG. 1.

Referring to FIGS. 1 and 14, when the image processing process is started, the controller 101c determines whether or not the image processing request sent the image forming apparatus 102 in the step S1304 of the image output process in FIG. 13 has been received (step S2101). If the image processing request has not been received from the image forming apparatus 102 (NO to the step S2101), the controller 101c awaits reception of the image processing request.

On the other hand, if the image processing request has been received (YES to the step S2101), the controller 101c reads out from the storage section 101b the settings configured on the web page associated with the identifier contained in the image processing request (step S2102). Then, the controller 101c receives image forming apparatus image data from the image forming apparatus 102 (step S2103). The controller 101c performs image processing on the image forming apparatus image data according to the settings configured on the web page (step S2104).

Next, the controller 101c sends the processed image data as external apparatus image data to the image forming apparatus 102 (step S2105). Then, the controller 101c determines whether or not the notification of termination of the image processing request sent from the image forming apparatus 102 in the step S1311 of the image output process in FIG. 13 has been received (step S2106).

If the notification of termination of the image processing request has not been received (NO to the step S2106), the controller 101c returns to the step S2103 to continue the process. On the other hand, if the notification of termination of the image processing request has been received (YES to the step S2106), the controller 101c terminates the image processing process.

It should be noted that, as is apparent from the above description, in the case of performing image formation according to image data, the image forming apparatus 102 forms an image, selectively using the internal image processing functions. In the case of making use of the external apparatus 101, the controller 102c communicates with the network communication section 102a to send not only the internal configuration parameters and external configuration parameters, but also internal image processing information indicative of internal image processing functions to the external apparatus 101.

The internal configuration parameters, the external configuration parameters, and the internal image processing information are received by the controller 101c. The controller 101c refers to determination conditions defined in advance, based on the internal configuration parameters, the external configuration parameters, and the internal image processing information, to thereby determine whether or not there is image processing function to be executed by the external apparatus 101 on behalf of the image forming apparatus 102 (substation image processing). If there is substitution image processing, the controller 101c sends substitution image processing information indicative of the substitution image processing to the image forming apparatus 102. Upon receiving the substitution image processing information, the controller 102c sends image data to the external apparatus 101.

Thus, the controller 102c functions as first and second selection units and a transmission unit of an image forming apparatus according to the invention. On the other hand, the controller 101c functions as a reception unit, a determination unit, and a transmission unit of an information processing apparatus according to the present invention.

Further, the controller 102c controls the image forming section 102e to perform image formation, but when the processed image data is received from the external apparatus, controls the image forming section 102e not to execute the image processing indicated by the substitution image processing information. Then, the controller 102c performs print control according to the processed image data. In short, the controller 102c functions as a control unit.

As described above, according to the present embodiment, it is possible to make effective use of the external apparatus according to an extension image processing function provided by the external apparatus, irrespective of image processing functions provided in the image forming apparatus. This makes it possible to perform a high-speed and more reliable image forming operation, and perform excellent image formation with a reduced amount of data transfer even in the case where image formation is performed on a page-by-page basis by cooperation of a plurality of apparatuses.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

For example, an image forming method realized by the operations of the image forming apparatus according to the above-described embodiment may be caused to be executed by a computer provided in the image forming apparatus. In this case, a computer-executable program for causing the computer to execute the image forming method is created, and is executed by the computer provided in the image forming apparatus.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

REFERENCE SIGNS LIST 101 external apparatus
102 image forming apparatus
104 network
101a, 102a network communication section
101b, 102b storage section
101c, 102c controller
102d image input section
102e image forming section
102f console section

The invention claimed is:

1. An image forming apparatus having a plurality of image processing functions and being configured to perform image formation using the plurality of image processing functions, the image forming apparatus being connectable to an information processing apparatus having a plurality of image processing functions via a network, the image forming apparatus comprising:
   a processor; and
   a memory storing instructions that, when executed by the processor, implement:
      a first selection unit configured to select a first image processing function from the plurality of image processing functions of the image forming apparatus;
      a second selection unit configured to select a second image processing function from the plurality of image processing functions of the information processing apparatus; and
      a transmission unit configured to transmit information indicative of at least the first image processing function selected by the first selection unit and the second image processing function selected by the second selection unit to the information processing apparatus,
   wherein the information processing apparatus has a storage unit configured to store, in advance, determination condition information,
   wherein the information processing apparatus has a determination unit configured to determine whether or not the first image processing function is to be performed by the information processing apparatus on behalf of the image forming apparatus, based on the information transmitted by the transmission unit and the determination condition information stored in the storage unit,
   wherein the image forming apparatus further comprises a control unit configured to be operable, when information indicative of the first image processing function is to be performed by the information processing apparatus on behalf of the image forming apparatus is received in a case where the first image processing function is to be performed by the information processing apparatus on behalf of the image forming apparatus, to control the image forming apparatus such that the image forming apparatus does not perform the first image processing function, and
   wherein the determination unit determines whether or not the information processing apparatus should execute the selected first image processing function on behalf of the image forming apparatus, while executing the selected second image processing function, based on a combination condition between the selected first image processing function and the selected second image processing function.

2. The image forming apparatus according to claim 1, wherein the memory further stores instructions that, when executed by the processor, implement a print unit configured to be operable in a case where processed image data subjected to image processing by the information processing apparatus is received, to perform printing according to the processed image data.

3. The image forming apparatus according to claim 1, wherein the first selection unit displays a first selection screen for selecting from the plurality of image processing functions of the image forming apparatus, and the second selection unit displays a second selection screen for selecting from the plurality of image processing functions of the information processing apparatus.

4. The image forming apparatus according to claim 3,
   wherein the network is the Internet, and
   wherein the second selection unit receives a web page from the information processing apparatus and displays the web page as the second selection screen.

5. The image forming apparatus according to claim 3, wherein, when a predetermined operation is performed on the first selection screen, the first selection unit leaves processing to the second selection unit, and the second selection unit displays the second selection screen.

6. The image forming apparatus according to claim 1, wherein the determination unit determines, in a case where an output result of an image depends on the order of execution of the selected first image processing function and execution of the selected second image processing function, that the information processing apparatus should execute the selected first image processing function on behalf of the image forming apparatus, while executing the selected second image processing function.

7. An information processing apparatus having a plurality of image processing functions, the information processing apparatus comprising:
   a processor; and
   a memory storing instructions that, when executed by the processor, implement:
      a connection unit configured to connect to an image forming apparatus which has a plurality of image processing functions and is configured to perform image formation using the plurality of image processing functions;
      a reception unit configured to receive information indicative of a first image processing function selected from the plurality of image processing functions of the image forming apparatus and a second image processing function selected from the plurality of image processing functions of the information processing apparatus;
      a storage unit configured to store, in advance, determination condition information;
      a determination unit configured to determine whether or not the first image processing function is to be performed by the information processing apparatus on behalf of the image forming apparatus, based on the information received by the reception unit and the determination condition information stored in the storage unit; and
      a transmission unit configured to transmit a result of the determination by the determination unit to the image forming apparatus,
   wherein the determination unit determines whether or not the information processing apparatus should execute the selected first image processing function on behalf of the image forming apparatus, while executing the selected second image processing function, based on a combination condition between the selected first image processing function and the selected second image processing function.

8. An image forming method of performing image formation using an image forming apparatus having a plurality of image processing functions and being configured to perform image formation using the plurality of image processing functions, the image forming apparatus being connectable to an information processing apparatus having a plurality of image processing functions via a network, the image forming method comprising:

selecting a first image processing function from the plurality of image processing functions of the image forming apparatus;
selecting a second image processing function from the plurality of image processing functions of the information processing apparatus;
transmitting information indicative of at least the first image processing function and the second image processing function to the information processing apparatus;
storing, in advance, determination condition information in the information processing apparatus;
determining whether or not the first image processing function is to be performed by the information processing apparatus on behalf of the image forming apparatus, based on the information transmitted and the stored determination condition information; and
controlling, when information indicative of the first image processing function is to be performed by the information processing apparatus on behalf of the image forming apparatus is received in a case where the first image processing function is to be performed by the information processing apparatus on behalf of the image forming apparatus, the image forming apparatus such that the image forming apparatus does not perform the first image processing function,
wherein the determining includes determining whether or not the information processing apparatus should execute the selected first image processing function on behalf of the image forming apparatus, while executing the selected second image processing function, based on a combination condition between the selected first image processing function and the selected second image processing function.

9. A non-transitory computer-readable storage medium storing a computer-executable image forming program for causing a computer to execute an image forming method of performing image formation using an image forming apparatus having a plurality of image processing functions and being configured to perform image formation using the plurality of image processing functions, the image forming apparatus being connectable to an information processing apparatus having a plurality of image processing functions via a network, the image forming method comprising:
selecting a first image processing function from the plurality of image processing functions of the image forming apparatus;
selecting a second image processing function from the plurality of image processing functions of the information processing apparatus;
transmitting information indicative of at least the first image processing function and the second image processing function to the information processing apparatus;
storing, in advance, determination condition information in the information processing apparatus;
determining whether or not the first image processing function is to be performed by the information processing apparatus on behalf of the image forming apparatus, based on the information transmitted and the stored determination condition information; and
controlling, when information indicative of the first image processing function is to be performed by the information processing apparatus on behalf of the image forming apparatus is received in a case where the first image processing function is to be performed by the information processing apparatus on behalf of the image forming apparatus, the image forming apparatus such that the image forming apparatus does not perform the first image processing function,
wherein the determining includes determining whether or not the information processing apparatus should execute the selected first image processing function on behalf of the image forming apparatus, while executing the selected second image processing function, based on a combination condition between the selected first image processing function and the selected second image processing function.

10. A printing system comprising:
an image forming apparatus having a plurality of image processing functions and being configured to perform image formation using the plurality of image processing functions; and
an information processing apparatus having a plurality of image processing functions,
wherein the image forming apparatus is connectable to the information processing apparatus via a network,
wherein the image forming apparatus comprises:
a first processor;
a first memory storing instructions that, when executed by the first processor, implement:
a first selection unit configured to select a first image processing function from the plurality of image processing functions of the image forming apparatus;
a second selection unit configured to select a second image processing function from the plurality of image processing functions of the information processing apparatus; and
a transmission unit configured to transmit information indicative of at least the first image processing function selected by the first selection unit and the second image processing function selected by the second selection unit to the information processing apparatus; and
a control unit configured to be operable, when information indicative of the first image processing function is to be performed by the information processing apparatus on behalf of the image forming apparatus is received in a case where the first image processing function is to be performed by the information processing apparatus on behalf of the image forming apparatus, to control the image forming apparatus such that the image forming apparatus does not perform the first image processing function,
wherein the information processing apparatus comprises:
a second processor; and
a second memory storing instructions that, when executed by the second processor, implement:
a connection unit configured to connect to the image forming apparatus;
a reception unit configured to receive information indicative of the first image processing function selected from the plurality of image processing functions of the image forming apparatus and the second image processing function selected from the plurality of image processing functions of the information processing apparatus;
a storage unit configured to store, in advance, determination condition information;
a determination unit configured to determine whether or not the first image processing function is to be performed by the information processing apparatus on behalf of the image forming apparatus, based on the information received by the reception unit and the determination condition information stored in the storage unit; and a transmission unit configured to transmit a result of the determination by the determination unit to the image forming apparatus, wherein the determination unit determines whether or not the information processing apparatus should execute the selected first image processing function on behalf of the image forming apparatus, while executing the selected second image processing function, based on a combination condition between the selected first image processing function and the selected second image processing function.

11. The printing system according to claim 10, wherein the first memory of the image forming apparatus further stores instructions that, when executed by the first processor, implement a print unit configured to be operable when processed image data subjected to image processing by the information processing apparatus is received, to perform printing according to the processed image data.

12. The printing system according to claim 10, wherein the first selection unit displays a first selection screen for selecting from the image processing functions of the image forming apparatus, and the second selection unit displays a second selection screen for selecting from the image processing functions of the information processing apparatus.

13. The printing system according to claim 12,
wherein the network is the Internet, and
wherein the second selection unit receives a web page from the information processing apparatus and displays the web page as the second selection screen.

14. The printing system according to claim 12, wherein, when a predetermined operation is performed on the first selection screen, the first selection unit leaves processing to the second selection unit, and the second selection unit displays the second selection screen.

* * * * *